US010908094B2

(12) United States Patent
Bohn et al.

(10) Patent No.: US 10,908,094 B2
(45) Date of Patent: Feb. 2, 2021

(54) CLOSED BIPOLAR ELECTRODE-ENABLED ELECTROCHROMIC DETECTOR FOR CHEMICAL SENSING

(71) Applicant: University of Notre Dame du Lac, South Bend, IN (US)

(72) Inventors: Paul W. Bohn, South Bend, IN (US); Wei Xu, South Bend, IN (US); Kaiyu Fu, South Bend, IN (US); Chaoxiong Ma, South Bend, IN (US)

(73) Assignee: University of Notre Dame du Lac, South Bend, IN (US)

(*) Notice: Subject to any disclaimer, the term of this patent is extended or adjusted under 35 U.S.C. 154(b) by 84 days.

(21) Appl. No.: 16/324,451

(22) PCT Filed: Aug. 11, 2017

(86) PCT No.: PCT/US2017/046501
§ 371 (c)(1),
(2) Date: Feb. 8, 2019

(87) PCT Pub. No.: WO2018/031888
PCT Pub. Date: Feb. 15, 2018

(65) Prior Publication Data
US 2019/0178807 A1    Jun. 13, 2019

Related U.S. Application Data

(60) Provisional application No. 62/509,641, filed on May 22, 2017, provisional application No. 62/374,206, filed on Aug. 12, 2016.

(51) Int. Cl.
*G01N 21/78*    (2006.01)
*G01N 27/30*    (2006.01)
(Continued)

(52) U.S. Cl.
CPC .......... *G01N 21/78* (2013.01); *G01N 27/305* (2013.01); *G01N 27/3277* (2013.01); *G01N 31/22* (2013.01)

(58) Field of Classification Search
None
See application file for complete search history.

(56) References Cited

U.S. PATENT DOCUMENTS

| 3,961,842 A | 6/1976 | Jasinski |
| 2004/0129579 A1 | 7/2004 | Crooks et al. |

(Continued)

FOREIGN PATENT DOCUMENTS

WO    2015159280 A1    10/2015

OTHER PUBLICATIONS

Fosdick et al., "Bipolar Electrochemistry," Bipolar Electrochem., 52(40):10438-10456, Sep. 2013.
(Continued)

*Primary Examiner* — J. Christopher Ball
(74) *Attorney, Agent, or Firm* — Haukaas Fortius PLLC; Michael H. Haukaas

(57) ABSTRACT

The described BPE-enabled device includes two separated chambers which perform detection and reporting independently. Analytical reaction of a target molecule in the analytical cell is coupled to and monitored by an electrochromic reaction in the reporting cell. The color change in the reporting cell can be determined spectrophotometrically by RGB analysis of a CCD image acquired via smartphone. This detection method provides a linear response and a low limit of detection due to the redox cycling behavior in both chambers. The BPE based electrochromic detector can be modified for sensing of multiple analytes by integrating three or more sets of detection chemistries into one single device. Multiple analytes with different concentrations can (Continued)

be detected within this device simultaneously. The BPE based electrochromic device can be used for metabolite detection, wherein a redox mediator can be combined with specific oxidases to form an electrochemical mediator-electrocatalyst pair that completes redox cycling reactions.

20 Claims, 17 Drawing Sheets

(51) Int. Cl.
  *G01N 27/327* (2006.01)
  *G01N 31/22* (2006.01)

(56) References Cited

U.S. PATENT DOCUMENTS

| | | |
|---|---|---|
| 2005/0019802 A1 | 1/2005 | Bahatt et al. |
| 2013/0087467 A1 | 4/2013 | Yang |
| 2014/0251813 A1 | 9/2014 | Wang et al. |

OTHER PUBLICATIONS

International Search Report and Written Opinion of the ISA/US dated Oct. 19, 2017 in International Application No. PCT/US2017/046501; 8pgs.

Kimmel et al., "Electrochemical Sensors and Biosensors," Anal. Chem., 84(2):685-707, Jan. 2012.

Loget et al., "Bipolar Electrochemistry: From Materials Science to Motion and Beyond," Acc. Chem. Res., 46 (11):2513-2523, May 2013.

Loget et al., "Shaping and Exploring the Micro- and Nanoworld Using Bipolar Electrochemistry," Anal Bioanal Chem., 400(6):1691-1704, Jun. 2011.

Ma et al., "Redox Cycling in Nanoscale-Recessed Ring-Disk Electrode Arrays for Enhanced Electrochemical Sensitivity," ACS Nano, 7(6):5483-5490, May 2013.

Ma et al., "Self-induced Redox Cycling Coupled Luminescence on Nanopore Recessed Disk-multiscale Bipolar Electrodes," Chem. Sci., 6:3173-3179, Mar. 2015.

Mavre, "Bipolar Electrodes: A Useful Tool for Concentration, Separation, and Detection of Analytes in Microelectrochemical Systems," Anal. Chem., 82(21):8766-8774, Sep. 2010.

Ronkainen et al., "Electrochemical Biosensors," Chem Soc Rev., 39(5):1747-1763, May 2010.

Turner, "Biosensors: Sense and Sensibility," Chem. Rev. Soc., 42(8):3175-3648, Apr. 2013.

Xu et al., "Closed Bipolar Electrode-enabled Dual-cell Electrochromic Detectors for Chemical Sensing," Analyst, 141:6018-6024, Sep. 2016.

Xu et al., "Coupling of Independent Electrochemical Reactions and Fluorescence at Closed Bipolar Interdigitated Electrode Arrays," Chem. Electro. Chem., 3(3):422-428, Mar. 2016.

ANALYTICAL CELL     REPORTER CELL

|  | Small (1 mm) | Medium (1.5 mm) | Large (2 mm) |
|---|---|---|---|
| 1.6V |  |  |  |
| 1.8V |  |  |  |
| 2.0V |  |  |  |
| 2.2V |  |  |  |
| 2.4V |  |  |  |
| 2.6V |  |  |  |
| 2.8V |  |  |  |

CLOSED BIPOLAR ELECTRODE-ENABLED ELECTROCHROMIC DETECTOR FOR CHEMICAL SENSING

RELATED APPLICATIONS

This application is a National Stage filing under 35 U.S.C. § 371 of International Application No. PCT/US2017/046501 filed Aug. 11, 2017, which claims priority under 35 U.S.C. § 119(e) to U.S. Provisional Patent Application No. 62/374,206, filed Aug. 12, 2016 and to U.S. Provisional Patent Application No. 62/509,641, filed May 22, 2017, which applications are incorporated herein by reference.

GOVERNMENT SUPPORT

This invention was made with government support under Grant No. DE FG02 07ER15851 awarded by the Department of Energy, and Grant No. NSF1404744 awarded by the National Science Foundation. The government has certain rights in the invention.

BACKGROUND OF THE INVENTION

Bipolar electrochemistry, which relies on redox reactions occurring at the opposite ends of bipolar electrodes (BPE), provides a new paradigm for electrochemical sensing—one with excellent sensitivity, versatility, and the capability to implement multiplex sensing. BPEs are typically constructed from a non-biased electronic conductor placed in direct contact with a fluid supporting an electric field, i.e., an electrified fluid. The potential gradient in the fluid maps onto the isopotential of the BPE, creating interfacial potential differences between the poles of the BPE and the electrolyte solution in contact with them—oxidizing at one end and reducing at the other. Modulation of this potential difference allows two distinct redox reactions to be coupled at the two ends (poles) of the BPE. By exploiting the compositional and geometric variety available to BPEs, various applications including material preparation and fabrication, electrochemical sensing, catalysis screening, micro swimmers, and bipolar electrode focusing have been demonstrated.

Depending on the purpose of the design, BPEs can be operated in either an open or closed configuration. In the open BPE, both cathode and anode are placed in the same fluid, typically inside a microchannel. On the other hand, closed BPE systems involve a single BPE in contact with physically isolated, and possibly chemically distinct, solutions connected to the anodic and cathodic poles of the BPE.

The rapid development of functional biomaterials and advanced fabrication technologies has enabled researchers to design biosensors with integrated biomolecular components, yielding improved sensitivities and fast response times. For example, electrochemical biosensors typically consist of integrated devices which combine a bio-recognition element with electrochemical transduction to provide analytical information about biomolecules. The biomolecular recognition event should be simple and fast and display high sensitivity, but most importantly it should be selective.

A number of different transducers have been developed, differing in the type of signal generated, including those based on potentiometry, voltammetry/amperometry, such as CV (cyclic voltammetry), differential pulse voltammetry (DPV), anodic stripping voltammetry (ASV), and impedimetric detection. However, few electrochemical biosensors have successfully made the transition from benchtop instruments to portable point-of-care devices.

Recently, by coupling fluorescence imaging with electrochemical reactions at bipolar interdigitated electrode arrays, we have shown that it is possible to translate the electron transfer event to a luminescence signal, allowing multiplex detection in a microfluidic system. These experiments exhibit the advantage of luminescence readout—near zero-background signal—as well as high spatial and temporal resolution.

A drawback of ECL and fluorescence reporting is that they typically require sophisticated equipment and optical alignment for data collection.

Accordingly, the challenge lies not only in building a sensitive and specific detector, but in integrating different parts together in a miniature device, with all parts working together to produce a signal free from interferences using technologies that allow for a simpler design. Furthermore, a design incorporating multiplex sensing is desirable, especially in biomedical applications, since accurate diagnosis of many disease conditions requires a combination of biomarkers.

SUMMARY

Bipolar electrodes (BPE) are electrically floating metallic elements placed in electrified fluids that enable the coupling of anodic and cathodic redox reactions at the opposite ends by electron transfer through the electrode. One particularly compelling application allows electron transfer reactions at one end of a closed BPE to be read out optically by inducing a redox-initiated change in the optical response function of a reporter system at the other end.

This disclosure provides a BPE-enabled apparatus and method for electrochemical sensing based on the electrochromic response of a methyl viologen (MV) reporter, which has been developed, characterized, and rendered in a field-deployable format (FIG. 1($b$)). BPE-enabled devices based on two thin-layer-cells of ITO and Pt were fabricated to couple an analytical reaction in one cell with an MV reporter reaction, producing a color change in the complementary cell. Using $Fe(CN)_6^{3/4-}$ as a model analyte, the electrochemically induced color change of MV was determined initially by measuring its absorbance via a CCD camera coupled to a microscope.

Smartphone-based detection and RGB analysis were employed to further simplify the sensing scheme. Both methods produced a linear relationship between the analyte concentration, the quantity of MV generated, and the colorimetric response, yielding a limit of detection of 1.0 µM. Similar responses were observed in the detection of dopamine and acetaminophen.

Further evolution of the device replaced the potentiostat with batteries to control potential, demonstrating the simplicity and portability of the device. Finally, the physical separation of the reporter and analytical cells renders the device competent to detect analytes in different (e.g. non-aqueous) phases, as demonstrated by using the electrochromic behavior of aqueous MV to detect ferrocene in acetonitrile in the analytical cell.

In this disclosure for a closed bipolar electrode-enabled sensor apparatus, the apparatus comprises:

a) a bipolar electrode having a first compartment and a paired compartment;

b) a first electrode in proximity to the first compartment of the bipolar electrode;

c) a second electrode in proximity to the paired compartment of the bipolar electrode;

d) an insulator, at the bipolar electrode, defining the first compartment and the paired compartment, wherein the first compartment and the paired compartment are connected by the bipolar electrode, and wherein the bipolar electrode is separated from the first electrode and the second electrode by the insulator; and e) a sensor at the paired compartment, wherein the paired compartment is configured to transmit an electrochromic signal by the sensor;

wherein a closed bipolar electrode has a closed configuration defined by elements a-d, and an electrochromic signal can be transmitted from the paired compartment of the closed bipolar electrode by the sensor that can sense a redox reaction of the analyte at the first compartment of the closed bipolar electrode when a potential exists across the first electrode and the second electrode; and optionally, wherein a multiplex apparatus of a closed bipolar electrode-enabled sensor includes more than one closed bipolar electrode in parallel with the first electrode and the second electrode.

Embodiments of the above apparatus include a sensor that comprises an electrochromic chemical reporter having an absorption spectrum that depends on the electrochromic chemical reporter's state of oxidation, and wherein the electrochromic chemical reporter's state of oxidation depends on an analyte's state of oxidation in the first compartment.

Other embodiments of the above apparatus include a bipolar electrode that is split into a first cell and a second cell that are physically separated, and wherein the first cell comprises the first compartment and second cell comprises the paired compartment, and the first cell and second cell are joined by an electrically conductive moiety that permits electron transfer between the first cell and the second cell.

This disclosure also provides a method of detecting an analyte, the method comprising:

a) adding a sample to the first compartment of the apparatus of claim 2, wherein the sample comprises an aqueous solution or the sample comprises a non-aqueous solution;

b) optionally measuring a baseline signal of the electrochromic chemical reporter with a colorimeter without applying a voltage across the first electrode and the second electrode;

c) applying a voltage potential across the first electrode and the second electrode;

d) selectively sensing the presence of an analyte that is present in the sample; and e) detecting a change in the signal of the electrochromic chemical reporter with a colorimeter after applying a voltage potential across the first electrode and the second electrode;

wherein the electrochromic chemical reporter signals a change in the electrochromic chemical reporter's absorption spectrum when an analyte is present in the sample; and wherein a different sample can be added to each first compartment of a multiplex apparatus for multiplex detection.

In the above method, embodiments of the colorimeter comprise a smart phone camera, and the smart phone camera records a red-green-blue (RGB) color image of the electrochromic chemical reporter.

Additionally, in various embodiments a redox reaction in the first compartment of the closed bipolar electrode results in an equal and opposite redox reaction in the paired compartment of the closed bipolar electrode, and wherein redox reactions in both the first compartment and the paired compartment are charged balanced and reversible.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

DETAILED DESCRIPTION

Figure 1A:
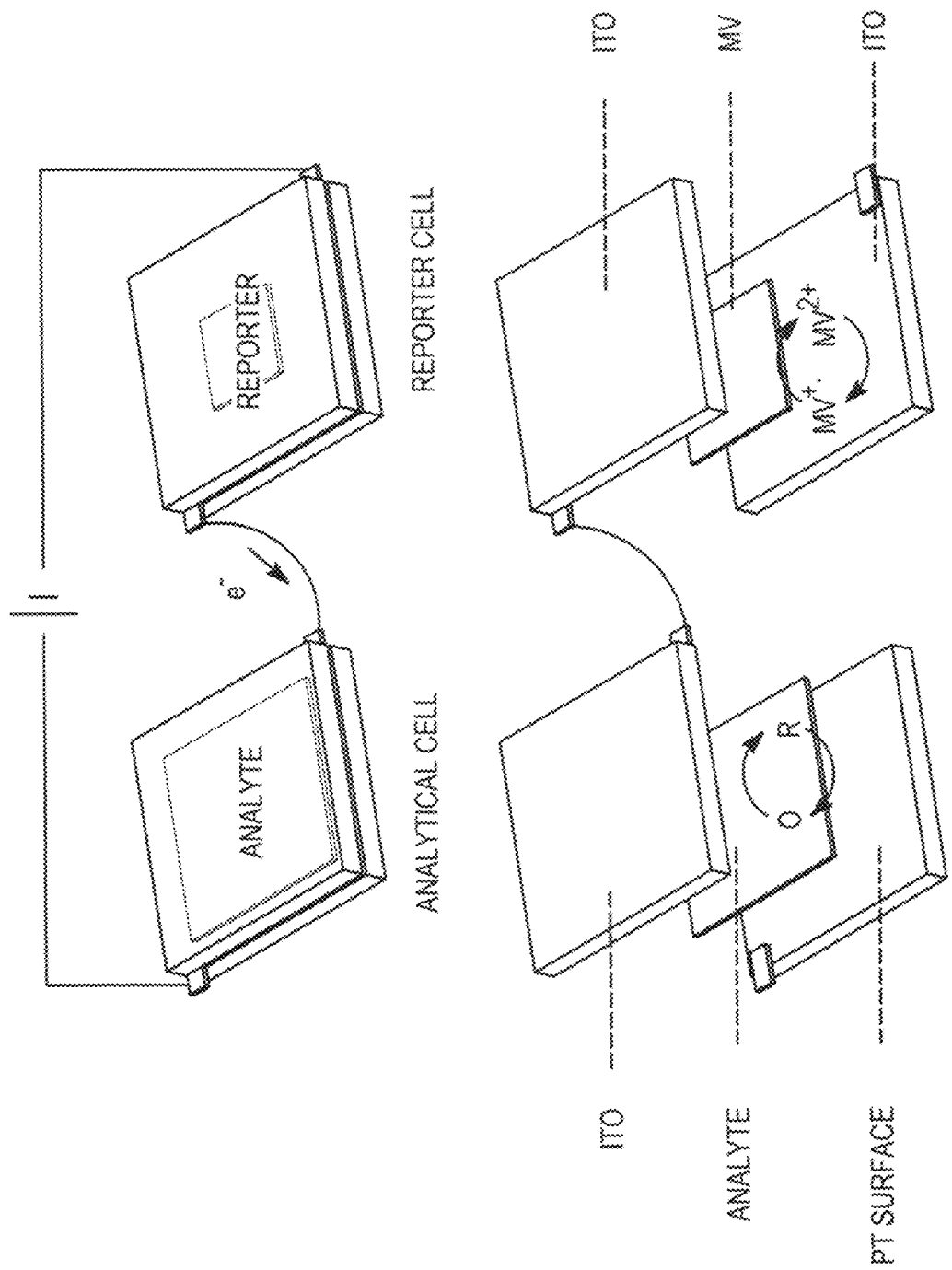
FIG. 1A-1B. (a) Schematic illustration of the closed BPE-enabled electrochromic sensor architecture. (b) Battery operation of a closed-BPE dual cell with colorimetric readout by smartphone camera yields a simple, inexpensive, field-deployable electrochemical sensor.
Figure 1B:
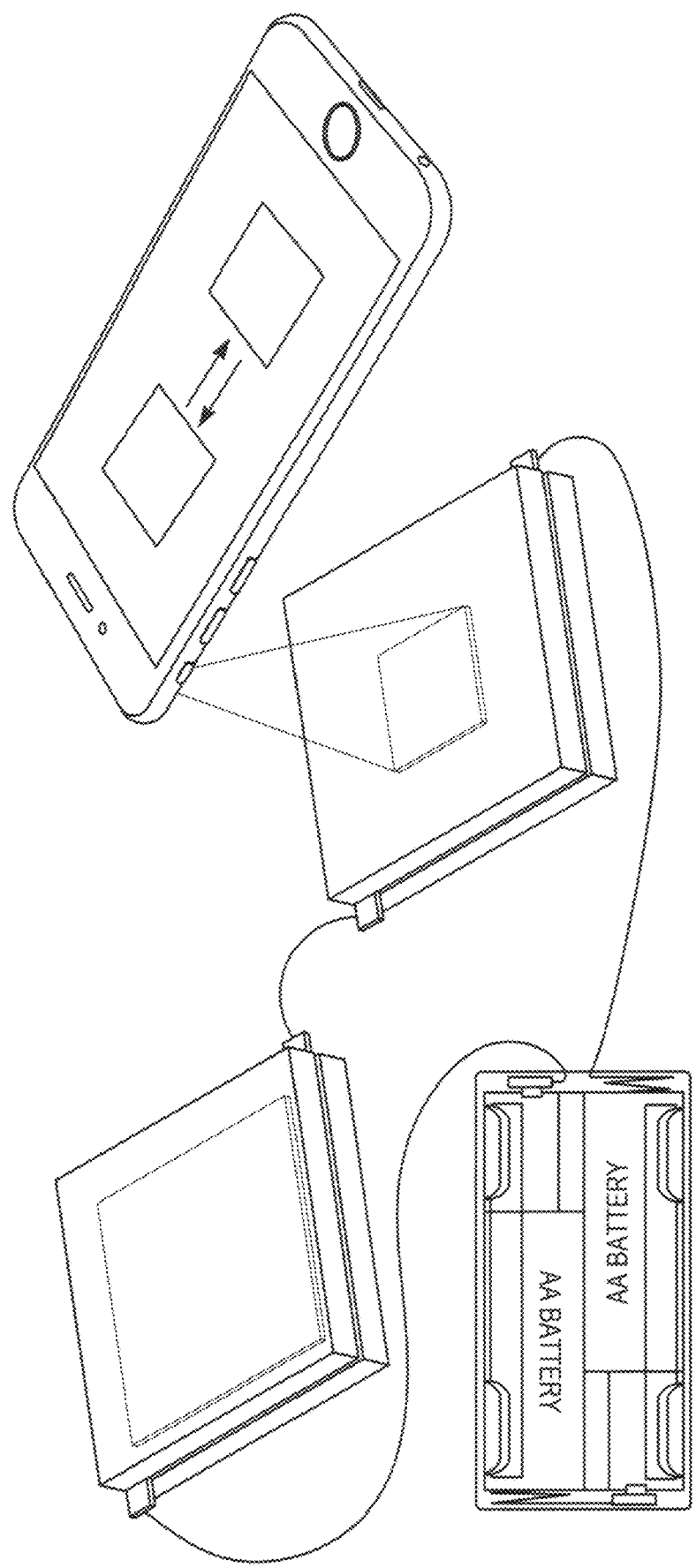

Biosensors based on converting electrochemical signals into optical readouts are attractive candidates as low-cost, high-throughput sensor platforms. This disclosure includes a closed bipolar electrode (CBE)-based two-cell electrochromic device for sensing multiple metabolites, using the simultaneous detection of lactate, glucose, and uric acid as a model system. In the two-cell configuration, an analytical cell contains a redox mediator combined with a specific oxidase, e.g. lactate oxidase, glucose oxidase or uricase, to form an electrochemical mediator-electrocatalyst pair that supports redox cycling. A closed bipolar electrode couples the electron transfer event in the analytical cell to an electrochromic reaction in a separate reporter cell, such that the magnitude of the color change is related to the concentration of metabolites in the analytical cell. To demonstrate multiplex operation, the CBE-based electrochromic detector is modified by integrating three sets of detection chemistries into a single device, in which simultaneous determination of glucose, lactate, and uric acid is demonstrated. Device sensitivity can be tuned by using reporter cells with different volumes. Furthermore, the analytical cell of this device can be fabricated as a disposable, paper-based carbon electrode without any pretreatment, demonstrating the potential to screen phenotypes that require multiple biomarkers in a point-of-care format.

Definitions

The following definitions are included to provide a clear and consistent understanding of the specification and claims. As used herein, the recited terms have the following meanings. All other terms and phrases used in this specification have their ordinary meanings as one of skill in the art would understand. Such ordinary meanings may be obtained by reference to technical dictionaries, such as *Hawley's Condensed Chemical Dictionary* $14^{th}$ Edition, by R. J. Lewis, John Wiley & Sons, New York, N.Y., 2001.

References in the specification to "one embodiment", "an embodiment", etc., indicate that the embodiment described may include a particular aspect, feature, structure, moiety, or characteristic, but not every embodiment necessarily includes that aspect, feature, structure, moiety, or characteristic. Moreover, such phrases may, but do not necessarily, refer to the same embodiment referred to in other portions of the specification. Further, when a particular aspect, feature, structure, moiety, or characteristic is described in connection with an embodiment, it is within the knowledge of one skilled in the art to affect or connect such aspect, feature, structure, moiety, or characteristic with other embodiments, whether or not explicitly described.

The singular forms "a," "an," and "the" include plural reference unless the context clearly dictates otherwise. Thus, for example, a reference to "a compound" includes a plurality of such compounds, so that a compound X includes a plurality of compounds X. It is further noted that the claims may be drafted to exclude any optional element. As such, this statement is intended to serve as antecedent basis for the use of exclusive terminology, such as "solely," "only," and the like, in connection with any element described herein, and/or the recitation of claim elements or use of "negative" limitations.

The term "and/or" means any one of the items, any combination of the items, or all of the items with which this term is associated. The phrases "one or more" and "at least one" are readily understood by one of skill in the art, particularly when read in context of its usage. For example, the phrase can mean one, two, three, four, five, six, ten, 100, or any upper limit approximately 10, 100, or 1000 times higher than a recited lower limit.

As will be understood by the skilled artisan, all numbers, including those expressing quantities of ingredients, properties such as molecular weight, reaction conditions, and so forth, are approximations and are understood as being optionally modified in all instances by the term "about." These values can vary depending upon the desired properties sought to be obtained by those skilled in the art utilizing the teachings of the descriptions herein. It is also understood that such values inherently contain variability necessarily resulting from the standard deviations found in their respective testing measurements. When values are expressed as approximations, by use of the antecedent "about," it will be understood that the particular value without the modifier "about" also forms a further aspect.

The terms "about" and "approximately" are used interchangeably. Both terms can refer to a variation of ±5%, ±10%, ±20%, or ±25% of the value specified. For example, "about 50" percent can in some embodiments carry a variation from 45 to 55 percent, or as otherwise defined by a particular claim. For integer ranges, the term "about" can include one or two integers greater than and/or less than a recited integer at each end of the range. Unless indicated otherwise herein, the terms "about" and "approximately" are intended to include values, e.g., weight percentages, proximate to the recited range that are equivalent in terms of the functionality of the individual ingredient, composition, or embodiment. The terms "about" and "approximately" can also modify the end-points of a recited range as discussed above in this paragraph.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. It is therefore understood that each unit between two particular units are also disclosed. For example, if 10 to 15 is disclosed, then 11, 12, 13, and 14 are also disclosed, individually, and as part of a range. A recited range (e.g., weight percentages or carbon groups) includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc. As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio. Accordingly, specific values recited for radicals, substituents, and ranges, are for illustration only; they do not exclude other defined values or other values within defined ranges for radicals and substituents. It will be further understood that the endpoints of each of the ranges are significant both in relation to the other endpoint, and independently of the other endpoint.

One skilled in the art will also readily recognize that where members are grouped together in a common manner, such as in a Markush group, the invention encompasses not only the entire group listed as a whole, but each member of the group individually and all possible subgroups of the main group. Additionally, for all purposes, the invention encompasses not only the main group, but also the main group absent one or more of the group members. The invention therefore envisages the explicit exclusion of any one or more of members of a recited group. Accordingly, provisos may apply to any of the disclosed categories or embodiments whereby any one or more of the recited elements, species, or embodiments, may be excluded from such categories or embodiments, for example, for use in an explicit negative limitation.

The term "contacting" refers to the act of touching, making contact, or of bringing to immediate or close proximity, including at the cellular or molecular level, for example, to bring about a physiological reaction, a chemical reaction, or a physical change, e.g., in a solution, in a reaction mixture, in vitro, or in vivo.

The term "substantial" as used herein, is a broad term and is used in its ordinary sense, including, without limitation, being largely but not necessarily wholly that which is specified. For example, the term could refer to a numerical value that may not be 100% the full numerical value. The full numerical value may be less by about 1%, about 2%, about 3%, about 4%, about 5%, about 6%, about 7%, about 8%, about 9%, about 10%, about 15%, or about 20%.

The terms "bipolar electrode (BPE)" refers to an electrically conductive material that promotes electrochemical reactions at its extremities (poles) even in the absence of a direct ohmic contact. More specifically, when sufficient voltage is applied to an electrolyte solution in which a BPE is immersed, the potential difference between the BPE and the solution drives oxidation and reduction reactions. Because no direct electrical connection is required to activate redox reactions, large arrays of electrodes can be controlled with just a single DC power supply or even a battery. BPEs or closed BPE refer to configurations that can be either "continuous" or "split", as known to persons skilled in the art. Continuous BPEs are comprised of a single conductor. Whereas split BPEs are comprised of two or more separate electrodes and electrically connected to create a BPE. However, BPEs are wireless in the sense that they are insulated from contact with the working electrode and counter electrode. This disclosure embodies both continuous and split configurations of BPEs.

The term "biomolecule" refers to a biological molecule such as a biologically relevant molecule (or chemical) that is present in living organisms, including large macromolecules such as proteins, carbohydrates, lipids, and nucleic acids, as well as small molecules such as primary metabolites, secondary metabolites, and natural products. A more general name for this class of material is biological materials. Biomolecules are usually endogenous but may also be exogenous. For example, pharmaceutical drugs may be natural products or semisynthetic (biopharmaceuticals) or they may be totally synthetic.

The term "electrochromic" refers to a phenomenon displayed by some materials of reversibly changing color by using bursts of charge to cause electrochemical redox reactions in electrochromic materials. Various types of materials and structures can be used to construct electrochromic devices, depending on the specific applications. Transition metal oxides are an example of a large family of materials possessing various properties relating to the field of electrochromism. In this disclosure, an electrochromic chemical reporter can be any chemical that changes its color corresponding to its oxidation state in response to a change (that it senses) in the oxidation state of an analyte undergoing a redox reaction in a sample. An electrochromic device (such as disclosed herein) controls or emits optical properties such as optical transmission, absorption, reflectance, and/or emittance in a continual but reversible manner on application of a voltage.

Embodiments of the Invention

In an embodiment of the disclosed closed bipolar electrode-enabled sensor apparatus, the apparatus comprises:

a) a bipolar electrode having a first compartment and a paired compartment;

b) a first electrode in proximity to the first compartment of the bipolar electrode;

c) a second electrode in proximity to the paired compartment of the bipolar electrode;

d) an insulator, at the bipolar electrode, defining the first compartment and the paired compartment. The first compartment and the paired compartment are connected by the bipolar electrode. Correspondingly, the first compartment and the paired compartment are separated by the insulator. Also, the bipolar electrode is separated from the first electrode and the second electrode by the insulator; and e) a sensor at the paired compartment, wherein the paired compartment is configured to transmit an electrochromic signal by the sensor;

wherein a closed bipolar electrode has a closed configuration defined by elements a-d. An electrochromic signal can be transmitted from the paired compartment of the closed bipolar electrode by the sensor that can sense a redox reaction of the analyte at the first compartment of the closed bipolar electrode when a potential exists across the first electrode and the second electrode (for example, when a potential is developed across the first electrode and the second electrode by an electric power source); and optionally, wherein a multiplex apparatus of a closed bipolar electrode-enabled sensor includes more than one closed bipolar electrode in parallel with the first electrode and the second electrode. In additional embodiments the closed bipolar electrode, the first electrode, and the second electrode comprise and interdigitated array. In other additional embodiments the first electrode is a working electrode, the second electrode is a counter electrode, or the second electrode is a quasi-reference electrode.

In various embodiments, the sensor comprises an electrochromic chemical reporter having an absorption spectrum that depends on the electrochromic chemical reporter's state of oxidation, and wherein the electrochromic chemical reporter's state of oxidation depends on an analyte's state of oxidation in the first compartment. In other embodiments, the electrochromic chemical reporter comprises a viologen, an alkyl viologen, paraquat, prussian blue, a molecule that changes color depending on its state of oxidation, a polymer that changes color depending on its state of oxidation (such as an electrochromic polymer), or a combination thereof. In yet other embodiments, the electrochromic chemical reporter has a concentration greater than 0 mM to about 30 mM in a solution, and wherein the solution optionally comprises an electrolyte. In some embodiments, the electrochromic chemical reporter has a concentration less than 25 mM, less than 20 mM, less than 15 mM, less than 10 mM, less than 5 mM, less than 2.5 mM, less than 1 mM, less than 0.5 mM, less than 0.1 mM, less than 0.01 mM or less than 0.001 mM.

In other embodiments, the first compartment and the paired compartment are fluidly disconnected, wherein, in some embodiments the insulator fluidly disconnects the first compartment and the paired compartment.

In other various embodiments, the paired compartment comprises an observation window that is essentially transparent in the spectral region of an electrochromic chemical reporter. In some embodiments, the observation window has a length less than about 10 mm and a width less than about 10 mm, or the observation window has a diameter less than about 10 mm. In other embodiments of the observation window, its length or width is less than 9 mm, less than 8 mm, less than 7 mm, less than 6 mm, less than 5 mm, less than 4 mm, less than 3 mm, less than 2 mm, less than 1 mm, less than 0.5 mm, less than 0.1 mm, or less than 0.01 mm.

In yet other various embodiments, the insulator has a thickness less than about 10 mm, less than about 5 mm, less than about 3 mm, less than about 2 mm, less than about 1 mm, less than about 0.5 mm, less than about 0.1 mm, less than about 0.05 mm, less than about 0.01 mm, or less than about 0.001 mm. Embodiments of the insulator comprise, for example, poly(dimethylsiloxane) (PDMS), sticky tape, or any electrically non-conducting material that is chemically compatible with other components of the apparatus, or compatible with the chemistries applied by the methods of this disclosure.

In some other embodiments, the apparatus comprises a potentiostat, a battery, or a solar cell as an electric power source. In yet other embodiments, the apparatus comprises a colorimeter. In additional embodiments, the colorimeter comprises a charge coupled device (CCD) camera, a complementary metal-oxide semiconductor (CMOS) camera, or a smart phone camera. In other additional embodiments, the first compartment comprises an inlet for a sample for analysis.

In some other embodiments, the bipolar electrode comprises a transparent electrode, such as indium tin oxide. In yet other embodiments, the first electrode comprises titanium and platinum, the first electrode comprises a cellulose-based carbon electrode, or the first electrode comprises a paper-based carbon electrode, and the second electrode comprises indium tin oxide. In additional embodiments of the first electrode, the first electrode comprises titanium, platinum, chromium, gold, nickel, ITO, or a combination thereof. Additionally, any thin conductive material coated on the flat substrate can be used as the first electrode.

In various additional embodiments, the bipolar electrode is split into a first cell and a second cell that are physically separated, and wherein the first cell comprises the first compartment and second cell comprises the paired compartment, and the first cell and second cell are joined by an electrically conductive moiety that permits electron transfer between the first cell and the second cell. In other embodiments, the conductive moiety is a wire of any dimension, preferably less than 1 m in length and substantially cylindrical with a diameter preferably less than 10 mm, wherein the wire comprises a metal, an alloy, a conductive organic molecule, or a conductive polymer. In yet other embodiments, the split cells are remote relative to each other. Embodiments of the apparatus include a closed bipolar electrode that permits electron transfer between the first cell and the second cell.

In various embodiments of a method of detecting an analyte, the method comprises:

a) adding a sample to the first compartment of the apparatus of claim 2, wherein the sample comprises an aqueous solution or the sample comprises a non-aqueous solution;

b) optionally measuring a baseline signal of the electrochromic chemical reporter with a colorimeter without applying a voltage across the first electrode and the second electrode;

c) applying a voltage potential across the first electrode and the second electrode;

d) selectively sensing the presence of an analyte that is present in the sample; and e) detecting a change in the signal of the electrochromic chemical reporter with a colorimeter after applying a voltage potential across the first electrode and the second electrode;

wherein the electrochromic chemical reporter signals a change in the electrochromic chemical reporter's absorption spectrum when an analyte is present in the sample; and wherein a different sample can be added to each first compartment of a multiplex apparatus for multiplex detection. In additional embodiments the first compartment comprises an analyte, and the paired compartment comprises an electrochromic chemical reporter.

In various other embodiments, the voltage potential ranges from about 0.01 volts to about 10 volts, about 0.1 volts to about 8 volts, about 0.5 volts to about 5 volts, about 0.5 volts to about 5 volts, about 1 volts to about 5 volts, about 1.5 volts to about 4 volts, about 0.01 volts to about 5 volts, about 0.01 volts to about 4 volts, about 0.01 volts to about 3 volts, about 0.01 volts to about 2 volts, about 0.01 volts to about 1 volts, about 0.01 volts to about 0.5 volts, or about 0.01 volts to about 0.1 volts.

In additional embodiments, the colorimeter comprises a smart phone camera, and the smart phone camera records a red-green-blue (RGB) color image of the electrochromic chemical reporter. The colorimeter may also comprise a charge coupled device (CCD), or a complementary metal-oxide semiconductor (CMOS). In yet other embodiments, the green channel of the RGB color image is analyzed to quantitate an analyte that is present in a sample. In some other embodiments, the red channel of the RGB color image is analyzed to quantitate an analyte that is present in a sample. In other embodiments, the blue channel of the RGB color image is analyzed to quantitate an analyte that is present in a sample. In some embodiments, any two channels of the RGB color image is analyzed to quantitate an analyte that is present in a sample.

In various embodiments, the sample comprises an analyte, an electrolyte, a redox mediator, an enzyme, a metabolite, a biomolecule, a catalyst, or a combination thereof. Some embodiments include a redox mediator and an enzyme that form an electrochemical mediator-electrocatalyst pair that support redox cycling (see FIG. 8($b$)). In some various embodiments, the constituents of the sample may each have a concentration that is less than 1000 mM, less than 750 mM, less than 500 mM, less than 200 mM, less than 100 mM, less than 75 mM, less than 50 mM, less than 25 mM, less than 20 mM, less than 15 mM, less than 10 mM, less than 5 mM, less than 2.5 mM, less than 1 mM, less than 0.5 mM, less than 0.1 mM, less than 0.01 mM less than 0.001 mM, less than 0.0001 mM, less than 0.00001 mM, less than 0.000001 mM, less than 0.0000001 mM.

In additional embodiments, the redox mediator comprises ferricyanide, a ferrocene, or a combination thereof. Additionally, the redox mediator can comprise hexaammineruthenium ($Ru(NH_3)_6^{3+}$), which is a widely used redox mediator in electroanalytical methods that performs well in the disclosed system. In various other embodiments, a redox reaction in the first compartment of the closed bipolar electrode results in an equal and opposite redox reaction in the paired compartment of the closed bipolar electrode, and wherein redox reactions in both the first compartment and the paired compartment are charged balanced and reversible.

Embodiments of this disclosure include colorimetry detection of the electrochromic chemical reporter that selectively reports on an analyte, such as a metabolite, wherein the limit of detection (LOD) is below 500 μM, below 400 μM, below 300 μM, below 200 μM, below 100 μM, below 50 μM, below 25 μM, below 10 μM, below 5 μM, below 2 μM, below 1 μM, below 0.5 μM, below 0.1 μM, below 0.01 μM, below 0.001 μM, below 0.0001 μM, below 0.00001 μM, below 0.000001 μIM, or below 0.0000001 μM.

In additional embodiments, the non-aqueous solution comprises, for example, acetonitrile, tetrahydrofuran, dimethyl sulfoxide, dimethyl formamide, methanol, ethanol, isopropanol, diethyl ether, polyethylene glycol, ethylene glycol, toluene, benzene, xylene, chloroform, dioxane, dichloromethane, carbon tetrachloride, N-methyl-2-pyrrolidone, pyridine, or a combination thereof.

Closed Bipolar Electrode-Enabled Dual-Cell Electrochromic Detectors for Chemical Sensing A major advantage of the closed BPE geometry is the physical isolation of the two redox systems, which simplifies the reaction scheme and eliminates possible interferences in chemical sensing. Since there is no fluid path connecting the anodic and cathodic poles of a closed BPE, the two half redox reactions at the poles of the BPE must be coupled by electron transport through the BPE. The closed BPE setup is analogous to two electrochemical cells in series, therefore, remote control or detection can be achieved. Accordingly, disposable analytical reaction cells can be coupled to the same reporter, which can be used repeatedly. In addition, because the detection reaction is independent of the analytical reaction, the analytes and the reporter can be in solutions with completely different properties. Similarly, detection is not limited to amperometry. For example, anodic dissolution of a metal film, which can be visually observed, has been used as a simple sensing scheme for BPE electrochemistry. More importantly, the closed BPE design can overcome the limitation of electrochemical methods for simultaneously measuring responses at multiple electrodes, such as electrode arrays. Indeed, electrochemiluminescence (ECL) and fluorescence have been coupled to analytical reactions through BPEs, not only improving measurement sensitivity, but also enabling high throughput, parallel sensing. Indirect BPE sensing for biorelevant targets such as 1,4-naphthoquinone and dopamine has been demonstrated based on pH gradients monitored by fluorescence imaging.

Colorimetric detection, on the other hand, is based on the color change of an indicator and is a straightforward and inexpensive way to capture the converted analyte signal. Among various colorimetric indicators, electrochromic materials are interesting, because they involve a shift in the absorption spectrum upon changing the redox state of the molecule. This property can be used to report redox events by coupling the electrochemical reactions of an analyte to that of an electrochromic indicator using a closed BPE. Depending on the requirements of the detection scheme, the indicator color change accompanying the analyte redox reaction can be monitored by a spectrometer or imaging device, such as a charge-coupled device (CCD) or flat-bed scanner, or even by direct visual observation.

In recent years, smartphones have been used as convenient tools for colorimetry, owing to their capability of capturing images with built-in camera and data processing capabilities. Smartphone colorimetry opens up new opportunities for simple, fast, and reliable detection, demonstrating potential for point-of-care and real-time diagnosis applications. In order to combine the advantages of BPE with colorimetry for electrochemical sensing, a colorimetric electrochemical sensor was developed using two ITO thin-layer cells to construct isolated analytical and reporter cells connected by a closed BPE. A redox indicator, methyl viologen (MV), which changes from a colorless oxidized state to a dark purple reduced state, was used as the reporter. The BPE-enabled electrochemical sensor was evaluated using the MV color change to construct a working curve for $Fe(CN)_6^{3/4-}$, as initially determined by a CCD camera coupled to an optical microscope. The color response of MV and its dependence on analyte concentration were also measured by smartphone and analyzed by RGB analysis of the resulting color images, demonstrating the capability of the method for monitoring electrochemical reactions at μM analyte concentrations. The same scheme was applied to the detection of dopamine and acetaminophen, confirming the applicability of the methods for different analytes with similar sensitivity. In order to further simplify the detection scheme, AA batteries were employed in place of a potentiostat to drive the electrochemical reaction. The results, which are in reasonable agreement with potentiostat-controlled voltammetry indicate the promise of the BPE-enabled device as a portable electrochromic sensor. Finally, the chemical independence of the analytical and detection regions was demonstrated by using ferrocene in acetonitrile as analyte, while the reaction was readout by monitoring the color change of aqueous MV by both CCD camera and smartphone.

Results and Discussion: Chemical Sensing

Figure 2A:
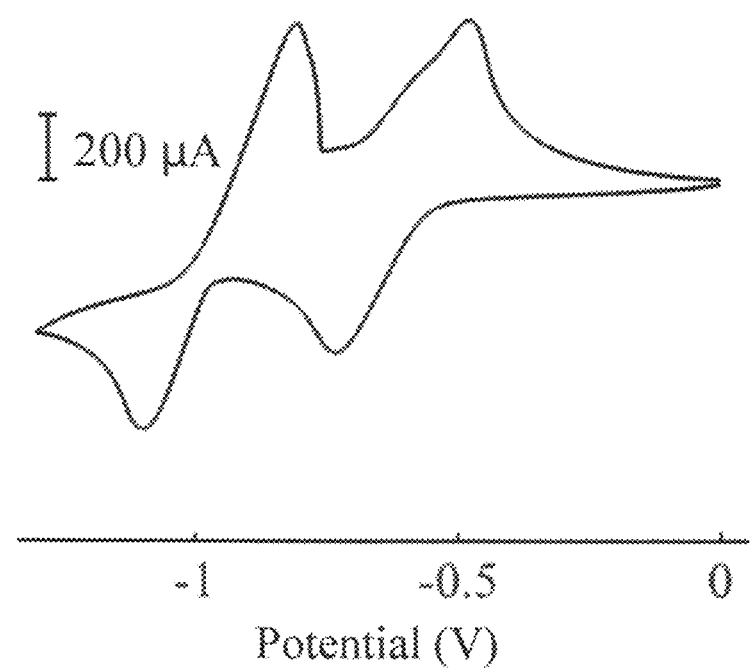
FIG. 2A-2B. (a) Cyclic voltammogram of 10 mM methyl viologen in 0.1 M aqueous KCl at a scan rate of 100 mV s$^{-1}$. (b) Relative absorption of MV in the reporter cell (left) and applied potential (right) as a function of time as measured by a CCD detector on an optical microscope with 20× magnification.
Figure 2B:
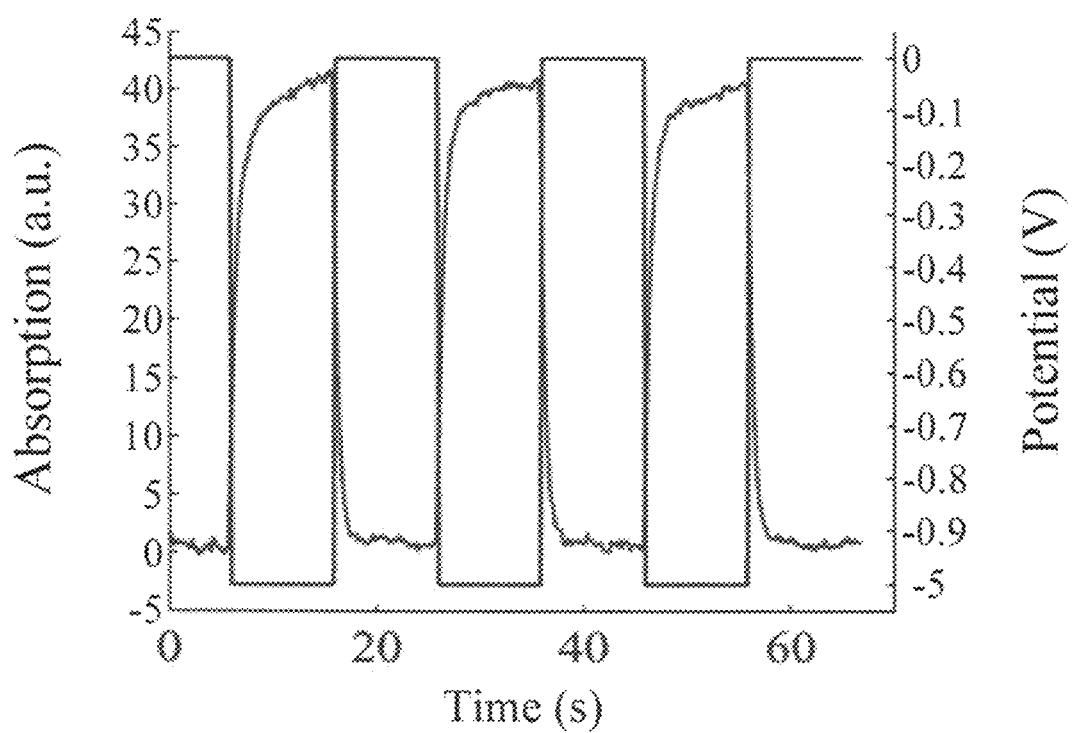

Methyl Viologen as an Electrochromic Reporter. The electrochromic molecule, methyl viologen ($MV^{2+}$), was used as the indicator in the reporter cell of the device. FIG. 2(a) shows the cyclic voltammetry (CV) of $MV^{2+}$ at the ITO working electrode. The waves indicate two successive reversible, one-electron transfer processes. Negative applied potentials lead to the reduction of colorless $MV^{2+}$ to a purple $MV^+$. and then, if sufficiently negative, ultimately to the fully reduced MV. In addition, the purple $MV^+$. can disproportionate into yellow MV and colorless $MV^{2+}$ upon the removal of negative potential. Thus, the color change between colorless and purple is reversible, since the other half reaction occurring at the CE involves the oxidation of MV back to $MV^{2+}$. To quantify the color change, a CCD camera coupled to an epi-illumination microscope measured the change of absorbance of MV in potential step experiments. As shown in FIG. 2(b), the light absorption increases significantly at −1.0 V, and recovers to the baseline level when the potential is returned to 0 V. The reversibility of the potential-dependent absorption change indicates that MV can be employed as a reusable electrochromic indicator. In addition, the process of color change, as well as the recovery of the colorless $MV^{2+}$ state, can be easily monitored by CCD or smartphone camera or by direct visual observation.

BPE-Enabled Colorimetry. The colorimetric reporter cell was filled with $MV^{2+}$ and then coupled to the analytical cell employing a Pt film working electrode ($WE_a$). An ITO electrode was used in the reporter cell, because it has good conductivity and transparency, allowing the BPE-enabled electrochromic color change to be monitored. $Fe(CN)_6^{3-}$ was added to the analytical cell at different concentrations, and positive potential pulses were applied to $WE_a$. In accord with the operating principles of closed BPE structures, reduction of $Fe(CN)_6^{3-}$ to $Fe(CN)_6^{4-}$ at the analytical cell end of the BPE, i.e. $BPE_a$, is accompanied by a complementary oxidation of $Fe(CN)_6^{4-}$ to $Fe(CN)_6^{3-}$ at $WE_a$. Although $Fe(CN)_6^{4-}$ was not added as an initial analyte, the thin-layer-cell geometry, allowing rapid diffusion of the redox product, enables the coupling reactions of $Fe(CN)_6^{3/4-}$ in the analytical cell, which are similar to those redox cycling reactions occurring in a dual electrode system. The reduction reaction at $BPE_a$ is counterbalanced by the oxidation of purple $MV^+$. to colorless $MV^{2+}$ at the reporter cell end of the BPE, i.e. $BPE_r$, and the reduction $MV^{2+}$ to $MV^+$. at the CE, as confirmed by the reversible color change between colorless and purple in the reporter cell. Similarly, $MV^+$. was not added to the reporter cell but rather generated by the reduction of $MV^{2+}$ at the CE, which moves rapidly to the $BPE_r$. Thus, the efficiency of the closed BPE electrochromic detector scheme depends intimately on the coupling of redox reactions in both cells, which, in turn, depends strongly on fabricating a cell with an optimized gap between $BPE_r$ and CE.

Figure 3A:
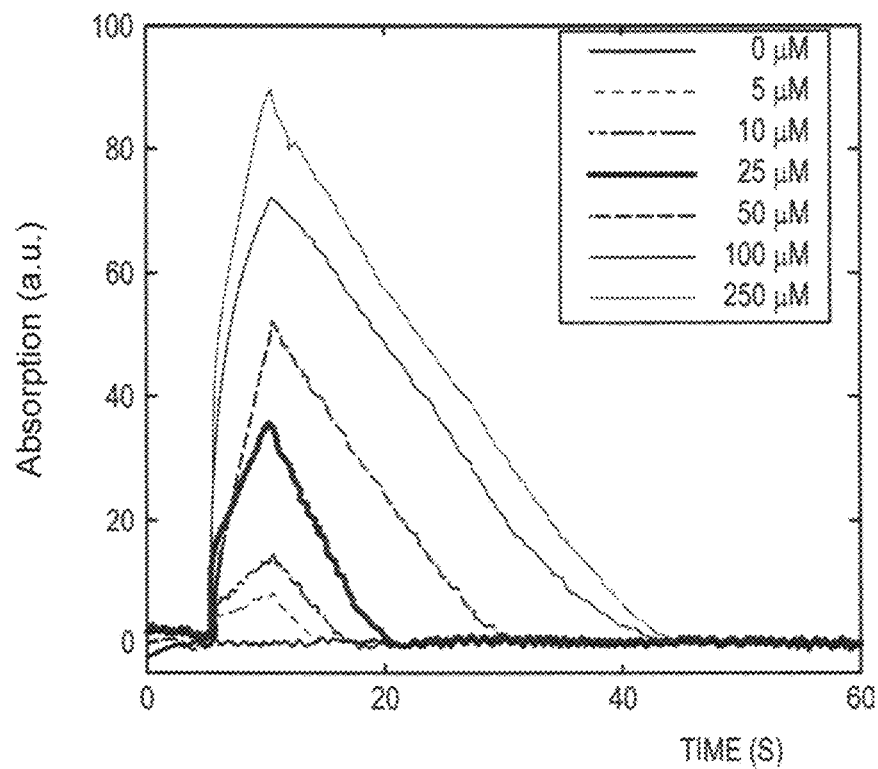
FIG. 3A-3B. (a) Absorbance of MV in the reporter cell in response to a potential pulse (3V, 5 s) applied to the analytical cell at different $Fe(CN)_6^{3-}$ concentrations. (b) Peak area of absorption wave as a function of $Fe(CN)_6^{3-}$ concentration and a linear fit for data below 100 µM.
Figure 3B:
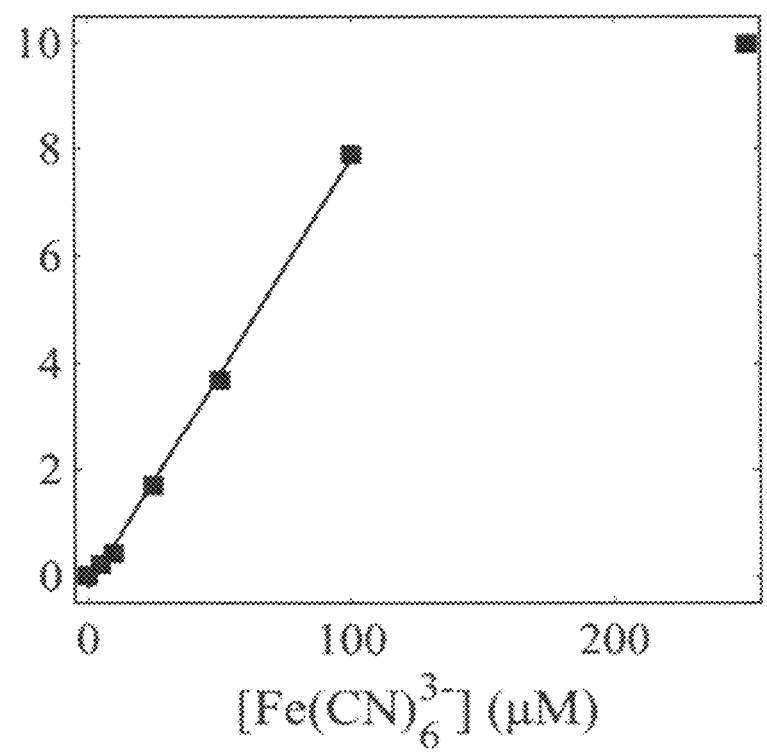

FIG. 3(a) shows the change in light absorption measured by the CCD camera in the reporter cell during application of a potential pulse (5 s at +3.0 V) applied to $WE_a$. A control experiment using 0.1 M KCl without $Fe(CN)_6^{3-}$ exhibited negligible color change in the reporter cell, which was confirmed by the CCD data, as shown in the 0 μM curve, FIG. 3(a). Thus, no redox reaction occurs to drive color change in the absence of the analyte, $Fe(CN)_6^{3-}$. In contrast, when the analytical cell is filled with $Fe(CN)_6^{3-}$, absorption resulting from the reduction of $MV^{2+}$ to $MV^+$. increases monotonically during the 5 s period of the applied potential pulse and returns to baseline level when the potential is removed. FIG. 3 clearly indicates that the magnitude of the absorption varies with analyte concentration and is linear at concentrations below 100 μM. The saturation of the signal above 100 μM likely results from saturation of the absorption, not non-linearity in the electrochemistry at $WE_a$. Another possible factor is that the amount of $MV^+$. produced is no longer proportional to the concentration of $Fe(CN)_6^{3-}$, since the redox event depends on the redox reactions at both cells and their coupling efficiency. By comparing the sensitivity obtained from FIG. 3(b) to fluctuations in the control experiment, 0 μM, FIG. 3(a), a limit of detection (LOD) of 1.0 μM was obtained.

Figure 4A:
FIG. 4A-4B. (a) Images of the MV solution in the reporter cell taken by smartphone at different concentrations of $Fe(CN)_6^{3-}$ in the analytical cell, increasing from 0 µM (left) to 1 mM (right). (b) Change in the green channel signal intensity ($\Delta I_G$) from RGB analysis of images in panel (a), and a linear fit of the data for concentrations below 100 µM (inset).

Smartphone Detection and RGB Analysis. In the previous section, the color change in the reporter cell induced by reaction of analyte in the analytical cell was demonstrated by measuring the change in absorption in the reporter cell, as measured by a CCD camera. In order to move the device toward a field-deployable format, the CCD camera was replaced by smartphone-based detection. Images of the reporter cell at different analyte concentrations were acquired by a smartphone camera, and RGB analysis was performed on the resulting color images. FIG. 4(a) shows the images of the $MV^+$. as $Fe(CN)_6^{3-}$ was tested at different concentrations. It can readily be seen that the color of the images changes in the presence of $Fe(CN)_6^{3-}$, becoming darker at higher concentrations. The lowest concentration of $Fe(CN)_6^{3-}$ in the analytical cell that could drive color change detectable by naked eye in the reporter cell was ~10 μM. When the $Fe(CN)_6^{3-}$ exceeds 100 μM, the difference of color change due to the increase of $Fe(CN)_6^{3-}$ concentration becomes indistinguishable visually. These results are consistent with the above observations obtained with a CCD camera.

Figure 4B:
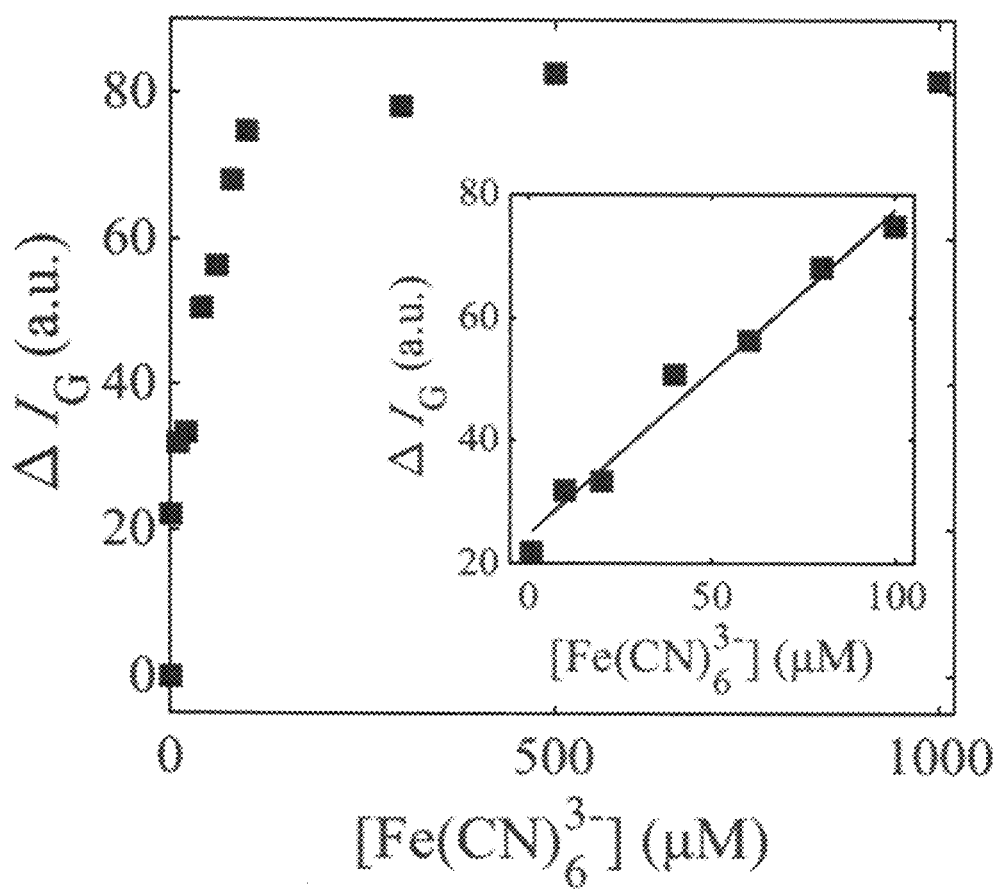

RGB analysis of the smartphone-acquired images is shown in FIG. 4(b), where signals from green channel were used, because the green channel exhibited somewhat better sensitivity than the red and blue channels. Consistent with the data acquired by CCD camera in FIG. 3, the data plotted in FIG. 4 demonstrate a linear response for $Fe(CN)_6^{3-}$ between 10 to 100 μM. These results confirm the applicability of the smartphone for BPE colorimetric detection of the electrochromic indicator, $MV^{2+}$, with similar sensitivity as an electron-multiplier CCD camera coupled to a low-power optical microscope. The consilience of the CCD and smartphone camera results is important for field applications, as the cost of the smartphone is ca. 100× less than that of the CCD camera, and the smartphone is, of course, field-portable.

Figure 5A:
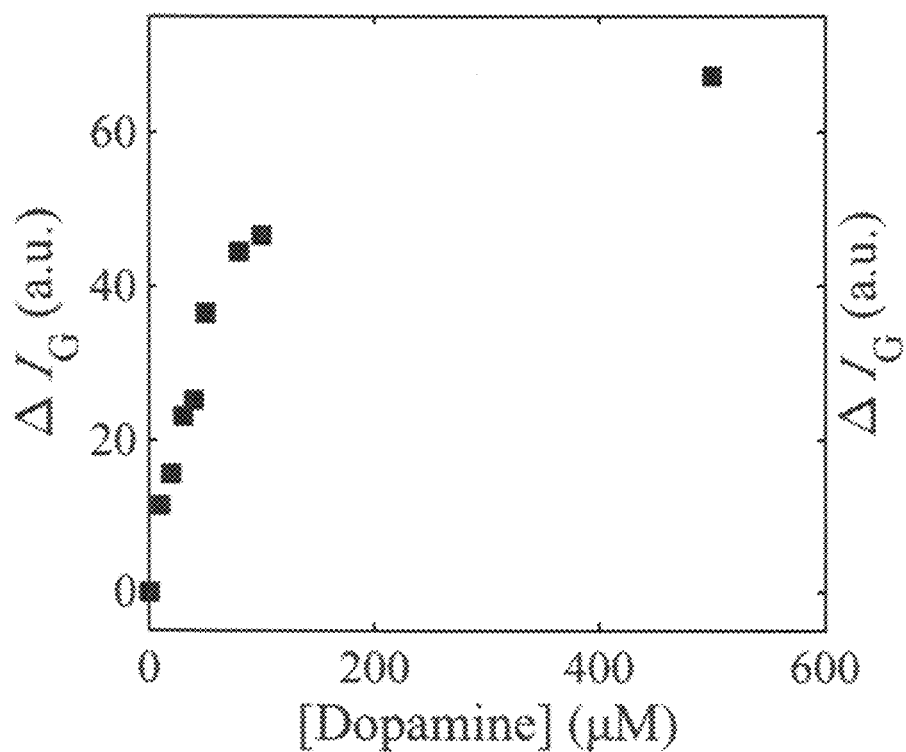
FIG. 5A-5B. Change in the green channel signal intensity ($\Delta I_G$) as a function of dopamine, (a), and acetaminophen, (b), concentration in a BPE-enabled electrochromic sensor using a smartphone and RGB analysis.
Figure 5B:
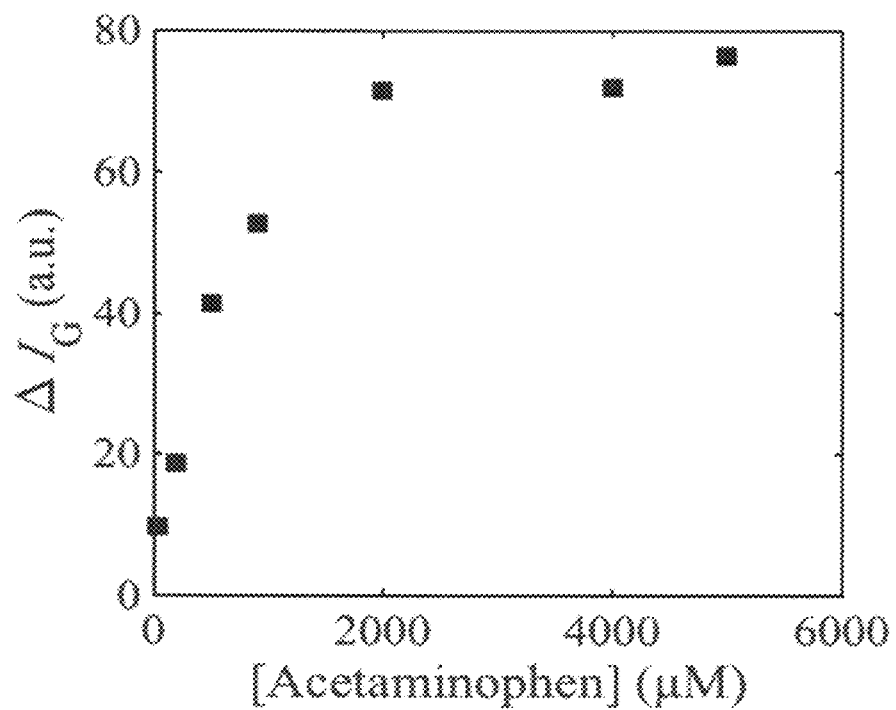

To illustrate the breadth of possible applications, the BPE-enabled electrochromic detection scheme was then used for the analysis of a neurotransmitter, dopamine (DA), and a pain medication, acetaminophen (AP). FIG. 5 shows the results of an RGB analysis of the images taken by a smartphone for both DA and AP. Similar to the results obtained for $Fe(CN)_6^{3-}$, increasing analyte concentrations in the analytical cell lead to larger $MV^+$. concentration and stronger absorption, exhibiting a linear region at low concentration and then a saturated region at high concentration of analyte. In the case of DA, the linear dynamic range is similar to that of $Fe(CN)_6^{3-}$, ranging to ca. 100 μM. On the other hand, RGB analysis of the smartphone images acquired from the reporter cell with increasing AP concentration in the analytical cell, FIG. 5(b), shows a linear range changes to ~500 μM, and saturated signal above [AP]~2 mM. The likely reason for this observation is that the acetaminophen undergoes a quasireversible reaction at the WE and is the factor limiting the coupling efficiency in the BPE-enabled device.

This is an intrinsic feature of BPE-coupled reactions in the closed BPE configuration, specifically because redox reactions of acetaminophen in the analytical cell are limited by the need for the BPE electrode to have access to a reversible reaction to balance the change of the charge in the chamber. Nevertheless, these results confirm that the BPE-coupled electrochromic effect can be extended beyond model analytes and applied to the determination of organic analytes of biomedical interest. In addition, the BPE detector presented here is compatible with a diverse set of electrochemical sensing techniques, such as those used for monitoring of glucose, cholesterol, and other health-related analytes. The physical separation of the analytical and reporter compartments serves to minimize the interference of the reporter system with the enzyme immobilized on the sensing electrode. The simple configuration and low cost of the device also suggests applications in the environmental monitoring, especially in resource-limited settings.

Figure 6A:
FIG. 6A-6B. (a) Images of the MV solution in the reporter cell taken by a smartphone in a BPE-enabled electrochromic sensor in which the analytical reaction is driven by batteries. Images were acquired at different concentration of $Fe(CN)_6^{3-}$, increasing from 0 µM (left) to 1 mM (right). (b) Change in $\Delta I_G$ from images in panel (a), and a linear fit of the data for concentrations lower than 40 µM (inset).
Figure 6B:
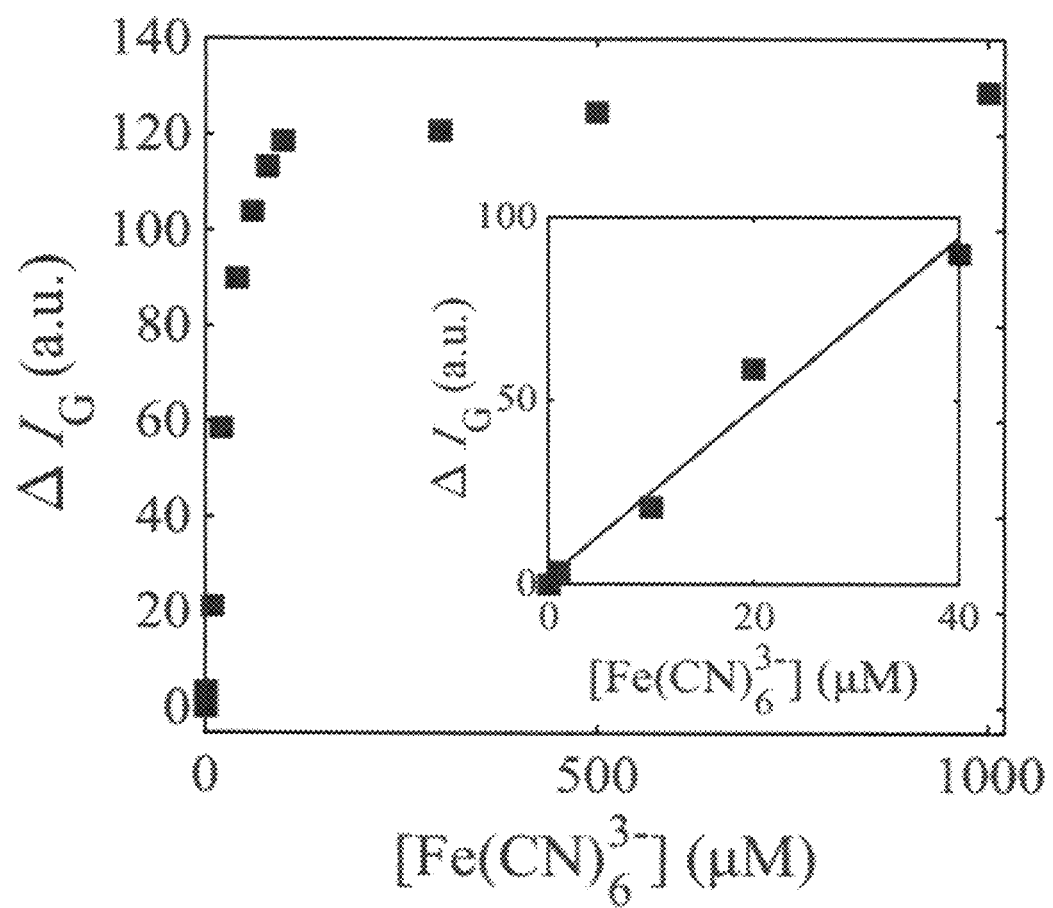

Battery-based Electrochromic Sensor. The results described in the previous section were obtained from a closed BPE-enabled device with applied potentials controlled by a potentiostat. Using batteries to replace a potentiostat represents an opportunity to further simplify the sensing scheme and, together with smartphone image acquisition, realize a portable, low cost device for electrochemical detection. In this experiment, two AA batteries in series were used to provide a steady output voltage of ~3.0 V, which is similar to the potential applied by the potentiostat in the previous experiments. FIG. 6(a) shows the optical images captured by a smartphone camera, and FIG. 6(b) shows the green channel RGB results for measurements of $Fe(CN)_6^{3-}$ at varying concentration. Similar to the results described above, in which a potentiostat was used (FIG. 4), the color of the images changes from colorless to increasingly deeper purple with increasing $Fe(CN)_6^{3-}$ concentration. These visual observations are confirmed by the RGB results which display both linear and saturated regions similar to those obtained using a potentiostat for potential control. The linear dynamic range obtained with battery-powered operation is somewhat smaller than that obtained with a potentiostat (FIG. 4), however these experiments do illustrate the possibility of using batteries to drive BPE-enabled colorimetric sensing with μM sensitivity.

Figure 7:
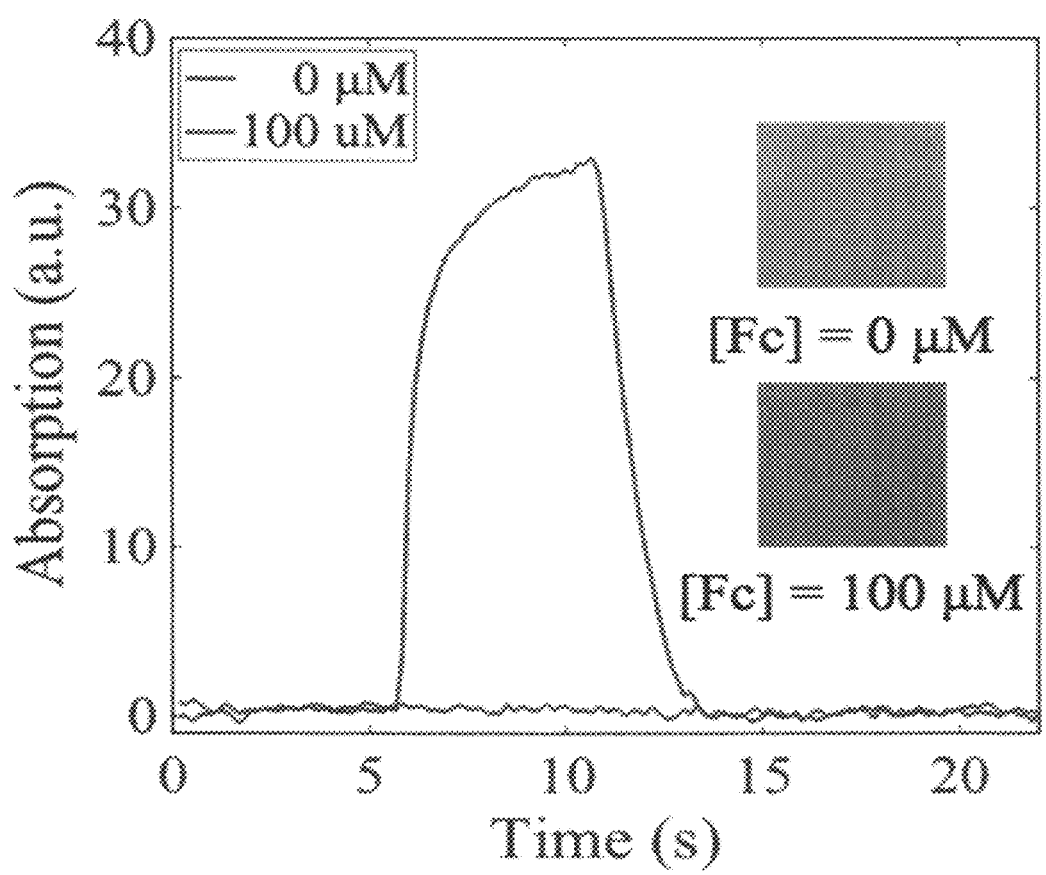
FIG. 7. Absorption of MV in the reporter cell changing as a function of concentration of Fc in the analytical cell upon applying a potential pulse (2V, 5 s), and the corresponding images captured by a smartphone (inset).

BPE-Enabled Detection in Non-aqueous Systems. The use of a closed-BPE system allows the analyte and reporter cells to have distinct properties and even chemical compositions. In order to evaluate the applicability of the BPE-enabled electrochromic sensor for measurements in non-aqueous solutions, ferrocene (Fc) in acetonitrile was used as the analyte, and it was coupled to the aqueous $MV^{2+}$ reporter system in a closed-BPE configuration. FIG. 7 shows an example of the $MV^{2+}$ color change upon reaction of Fc in 0.1 M TBATPB in acetonitrile. Compared with control experiments with supporting electrolyte alone, a color change can be detected visually down to 1 μM Fc. Increasing the Fc to 100 μM, a darker color was observed. This result was also confirmed by CCD camera measurements, consistent with the results obtained using $Fe(CN)_6^{3-}$ in aqueous solution (FIG. 3). It is interesting to note that Fc in acetonitrile is more effective in driving the BPE reactions than $Fe(CN)_6^{3-}$. Visual detection of the $MV^{2+}$ color change could be achieved for Fc concentrations as low as 1 μM Fc compared to 10 μM $Fe(CN)_6^{3-}$. This could be the result of the ideal redox reversibility of Fc and its large diffusion coefficient ($2.5 \times 10^{-9}$ $m^2$ $s^{-1}$) in acetonitrile, both of which contribute to higher coupling efficiency for redox reactions at the closed-BPE. By comparing the sensitivity for Fc detection to fluctuations in a control experiment, e.g. blue line in FIG. 7, an LOD of 0.3 μM for Fc detection was obtained.

Conclusions. A closed-BPE-enabled colorimetric device has been developed for electrochemical sensing in both aqueous and non-aqueous systems by exploiting the electrochromic behavior of methyl viologen as a reporter. In the device, electrochemical reactions occurring in the analytical cell are coupled to electrochromic reduction of colorless $MV^{2+}$ to purple $MV^{+}$. in the reporter cell, resulting in a color change that can be captured by electron-multiplied CCD camera, smartphone camera, or even visually. Furthermore, the applied potentials can be controlled either conventionally with a potentiostat, or with simple AA batteries. The combination of battery-powered operation of a compact closed-BPE dual cell configuration with resulting color changes being captured with a smartphone camera yields a simple, inexpensive, field-deployable electrochemical sensor.

In order to characterize the analytical figures of merit, $Fe(CN)_6^{3-}$ and Fc were used as analytes, and the $MV^{2+}$ color change was measured, demonstrating a strong dependence $MV^{2+}$ absorption change on analyte concentration. A linear dynamic range from 10 μM to 100 μM and an LOD of 1.0 μM were achieved for $Fe(CN)_6^{3-}$ in aqueous solution, while an LOD of 0.3 μM was determined for Fc in acetonitrile. The analytical figures of merit are almost certainly influenced strongly by the cell design, since the electrode spacing plays a major role in the limiting transport processes that couple reactions at the $WE_a$ and $BPE_a$ in the analytical cell and the $BPE_r$ and CE/QRE in the reporter cell. In the experiments reported here the goal was to achieve a simple device architecture that could support field-deployable applications, rather than to optimize analytical performance. One could alternatively, improve performance by decreasing the WE-BPE distance (50 μm in these experiments) and by increasing the geometric efficiency of the electrodes, for example by using interdigitated electrode arrays. Altogether, the demonstrated operating features make the BPE-enabled colorimetric device a promising platform for a variety of electrochemical sensing applications where low cost and simple operation are key attributes.

Electrochromic Sensor for Multiplex Detection of Metabolites Enabled by Closed Bipolar Electrode Coupling In traditional electrochemical biosensors, a (bio)chemically-modified electrode recognizes and reacts with biomolecules, producing an electrochemical signal which is captured and read out. In order to detect multiple analytes simultaneously, the detector needs to acquire and analyze multiple chemically distinct signals in parallel. Thus, an important goal is to design an electrochemical biosensor with high-throughput capacity to detect multiple biomarkers in a single measurement. To accomplish this, we employ an architecture in which separate analytical working electrodes are associated with a distinct biomolecular recognition motif, so that single analyte detection is performed separately in each cell. A second, and critically important, part of the strategy relies on transforming the electrochemical detection event to an optical signal, such as fluorescence or a colorimetric change. Colorimetric detection is particularly interesting, because it represents a direct approach to developing an analytical signal, which can be read out by a number of different detectors, e.g. CCD camera, smartphone, or even by direct visual inspection. This approach is attractive, because the electrochemical and optical signals are spatially separated, and the chemical systems constituting the analytical and reporter cells can be changed to achieve optimum performance. The question remains how to couple the analytical (electrochemical) and reporter (optical) cells.

Bipolar electrodes (BPEs) are a special type of electrode which can couple electrochemical detection to optical sensing in different cells. In principle, when a potential gradient is provided between two driving electrodes, and an electrically floating metallic element is placed in the electrified fluid, redox reactions are coupled at opposite poles of the BPE, even without external connections. Crooks and coworkers (A Large-Scale, Wireless Electrochemical Bipolar Electrode Microarray. *J. Am. Chem. Soc.* 2009, 131 (24), 8364), for example, have developed a variety of BPE-based devices for sensing and screening applications. In addition to these conventional open BPEs, closed bipolar electrode (CBE) systems place the anode and cathode in different solutions, such that they are chemically and fluidically isolated. Two distinct redox half reactions in different solution environments are coupled at the cathodic and anodic poles of the CBE by electron transport through the BPE. Therefore, CBE systems enable two redox systems to be independent from each other, thereby minimizing cross-talk or interference between the two systems. Demonstrating these principles, Zhang and coworkers (Electrogenerated Chemiluminescence Reporting on Closed Bipolar Microelectrodes and the Influence of Electrode Size. *ChemElectroChem* 2016, 3 (3), 457) demonstrated fluorescence-enabled electrochemical microscopy based on CBE structures, and Xu and coworkers (Visual Color-Switch Electrochemiluminescence Biosensing of Cancer Cell Based on Multichannel Bipolar Electrode Chip. *Anal. Chem.* 2016, 88 (5), 2884) coupled ECL detection with CBEs to detect biomarkers of protein and DNA. In our laboratory (Bohn et al., Coupling of Independent Electrochemical Reactions and Fluorescence at Closed Bipolar Interdigitated Electrode Arrays. *ChemElectroChem* 2016, 3 (3), 422), CBEs including interdigitated electrode arrays and microchannels have been coupled with fluorescence for chemical sensing. We also developed and characterized a single channel CBE-based electrochromic detector, which showed good performance in both aqueous and non-aqueous environments. In this latter design, the analytical reactions were isolated in an analytical cell and analyzed by monitoring the redox-induced color change in a BPE-coupled reporter cell via inter-cell electron transfer through the CBE.

Here, we describe a multiplex detection method for biomedically relevant metabolites (glucose, lactate, and uric acid) based on multi-cell CBE-enabled electrochromic biosensors. Electrons generated in the analytical cell are transferred through the CBE to a reporter cell, where they mediate reduction of methyl viologen ($MV^{2+}$), causing a colorless-to-purple color change. The color change can be recorded by smartphone, followed by RGB analysis. Multiplex detection of multiple analytes simultaneously is also accomplished within a single device. In one implementation of the multiple cell concept, a single analyte is determined at different concentrations by comparing the color change of the analyte with standards, making the device useful as a threshold detector. Furthermore, because a substrate-specific enzyme is used in the detection, good target molecule selectivity can be achieved during the detection.

Chronoamperometric current profiles confirm that only the specific enzyme substrate contributes to the observed color change. In addition, the sensitivity of the device can be adjusted by using reporter cells with different volumes to detect analytes in different concentration ranges. Finally, good performance is obtained when the device is coupled with paper-based carbon electrodes, supporting its applicability to point-of-care applications.

Results and Discussion: Multiplex Detection

Single Analyte Sensing. In the disclosure described above, model redox-active analytes, ferricyanide and ferrocene, were used to characterize the CBE-based electrochromic sensor device. In order to extend the device for use as a biosensing platform, essential molecular indictors of metabolism, such as lactate, glucose and uric acid, were measured using a similar approach. Unlike ferricyanide and ferrocene which undergo reversible redox reactions themselves, these biomolecules are not redox active. Therefore, electrochemical mediators were employed to couple enzymatic recognition reactions to the electrode through redox cycling, FIG. 8(b). Here, ferricyanide was combined with a specific oxidase, e.g. lactate oxidase, glucose oxidase or uricase, to form biochemically-specific mediator-electrocatalyst pairs.

In order to detect lactate, the sample was pretreated by mixing lactate with lactate oxidase and ferricyanide solution, then detection was performed after 20 min incubation. Detection was accomplished by the reaction of lactate with lactate oxidase (oxidized form) to produce pyruvate, converting the lactate oxidase back to its reduced form. Reduced lactate oxidase then reacts with ferricyanide to regenerate oxidized lactate oxidase and ferrocyanide. In order to complete the redox cycle, a sufficiently oxidizing potential is applied to $WE_a$ to convert ferrocyanide back to ferricyanide. Owing to the regeneration of lactate oxidase (oxidized form) and ferricyanide, redox cycling occurs as long as lactate is present in the mixture. Redox chemistry in the analytical cell is then coupled through the CBE to the reduction of methyl viologen in the reporter cell, the resulting $MV^{2+} \rightarrow MV^+$ reaction producing a color change in reporter cell. Although the scheme outlined here was demonstrated with lactate, clearly, the strategy is general for non-redox active analytes, provided they can be coupled to a redox active species with the aid of enzymes and electrochemical mediators.

Figure 9A:
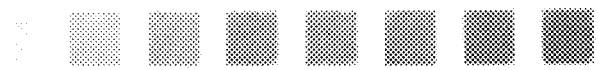
FIG. 9A-9B. (a) Color change in reporter cell for detection of lactate at different concentrations. (b) Change in the green channel signal intensity ($\Delta I_G$) from RGB analysis of images in panel (a). (Inset) $\Delta I_G$ data and linear fit for concentrations in the range 0-1 mM.
Figure 9B:
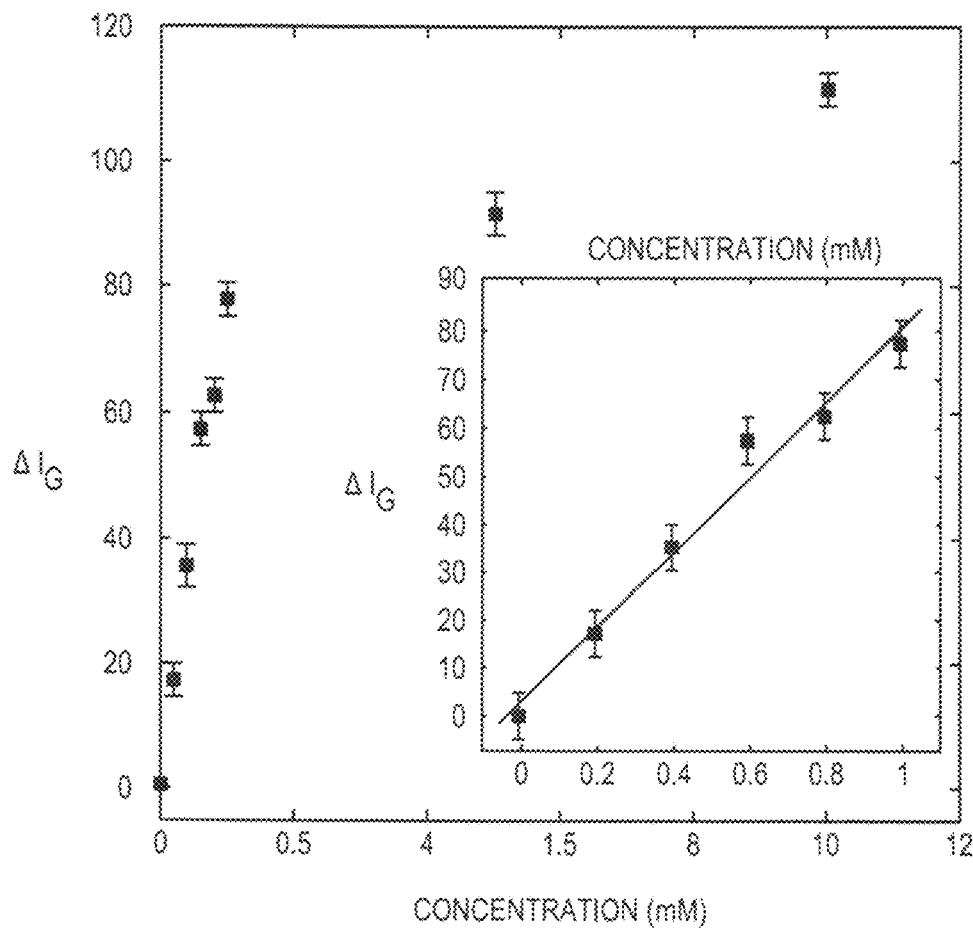

FIG. 9(a) shows images of color changes in the reporter cell when lactate at different concentrations was detected with $WE_a$=+3.0 V. A control experiment was performed with sample containing no lactate (0 mM), in which no color change was detected in the reporter cell, as shown in FIG. 9(a). Increasing lactate concentrations caused a purple color in the reporter cell corresponding to oxidation of lactate in the analytical cell. Because the control experiment showed no color change in the reporter cell, electrochemical interferences in the sample were negligible. The difference between non-zero lactate concentrations and the control experiment was also reflected in the measured chronoamperometric currents. Since redox cycling occurs only in the presence of lactate, higher currents were achieved for lactate detection, compared with the background current obtained in the without lactate. Redox cycling induced electron transfer through the CBE triggered the reduction of colorless $MV^{2+}$ to purple $MV^+$ (with perhaps also some contribution from the yellowish MV), which resulted in the color change in reporter cell. Lactate samples with different concentrations in the range of 0 to 10 mM were detected at the same potential, and produced color changes for which the green channel RGB value, $\Delta I_G$, is plotted in FIG. 9(b). As expected, the color change increases with increasing lactate concentration, with the response approaching saturation above 1 mM. As shown in the inset of FIG. 9(b), a linear response was observed in the concentration range 0 to 1 mM with slope=$7.74 \times 10^4$ $M^{-1}$ and limit of detection, LOD~180 µM.

Figure 15A:
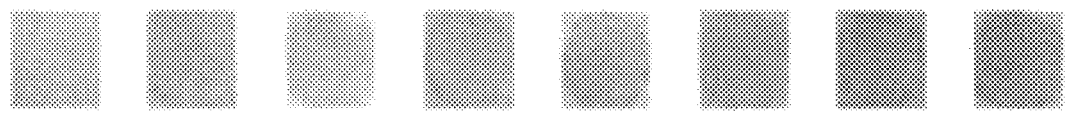
FIG. 15A-15B. (a) Color change in reporter cell for detection of glucose at different concentrations. (b) Change in the green channel signal intensity ($\Delta I_G$) from RGB analysis of images in panel (a). (Inset) $\Delta I_G$ data and linear fit for concentrations in the range 0-1 mM.
Figure 15B:
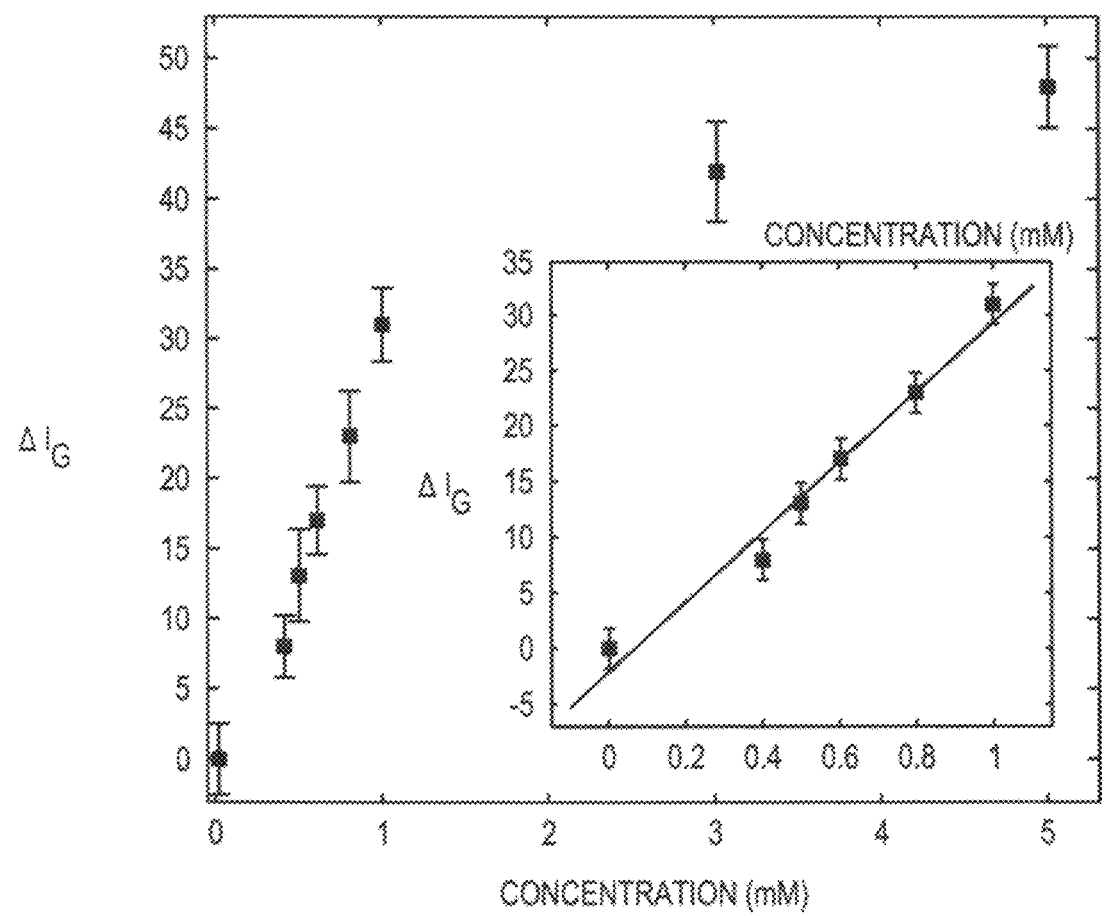
Figure 16A:
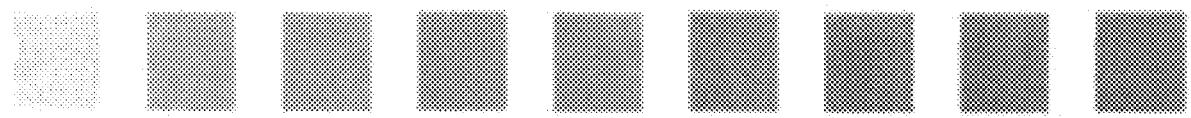
FIG. 16A-16B. (a) Color change in reporter cell for detection of uric acid at different concentrations. (b) Change in the green channel signal intensity ($\Delta I_G$) from RGB analysis of images in panel (a). (Inset) $\Delta I_G$ data and linear fit for concentrations in the range 0-1 mM.
Figure 16B:
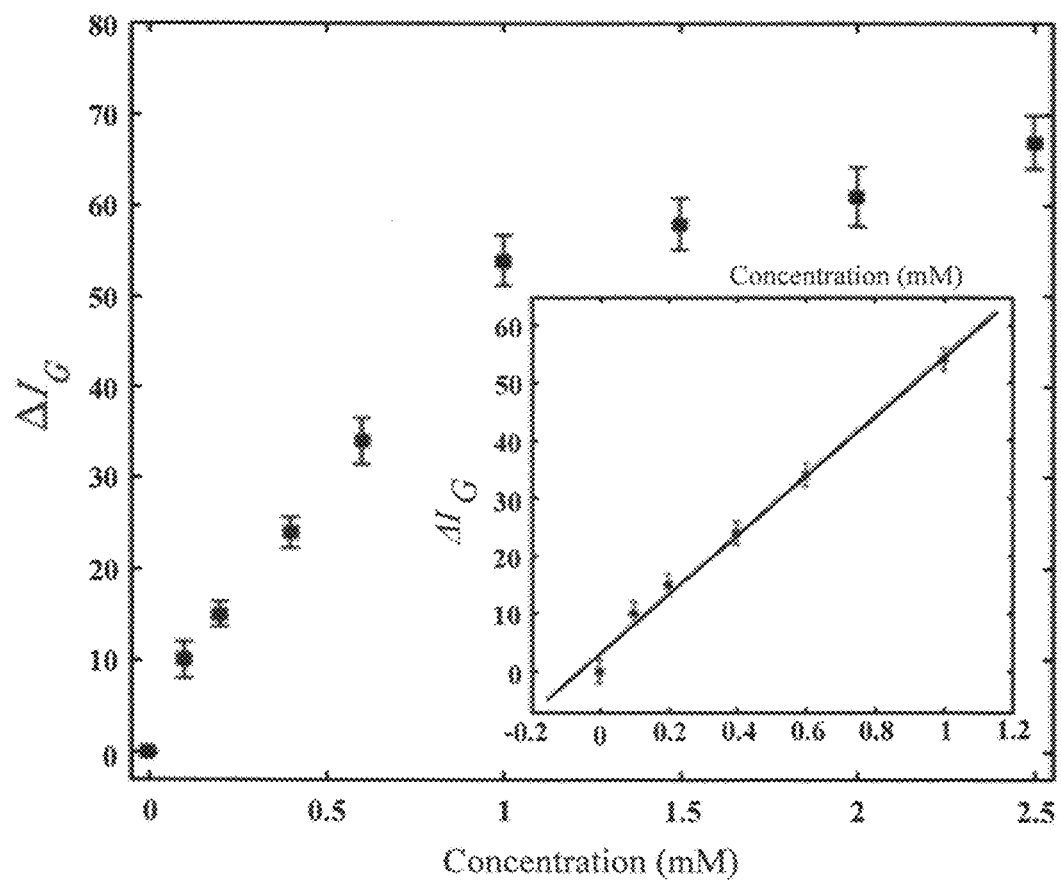

The successful detection of lactate in the CBE-enabled electrochromic device suggests that the device can be used to detect other metabolites. Thus, glucose (FIG. 15, Supporting Information) and uric acid (FIG. 16) were tested using the same strategy with the same device. Obvious color changes were observed when different concentrations of glucose and uric acid were placed in the analytical cell, and in both cases, a linear response was observed up to 1 mM.

Figure 10A:
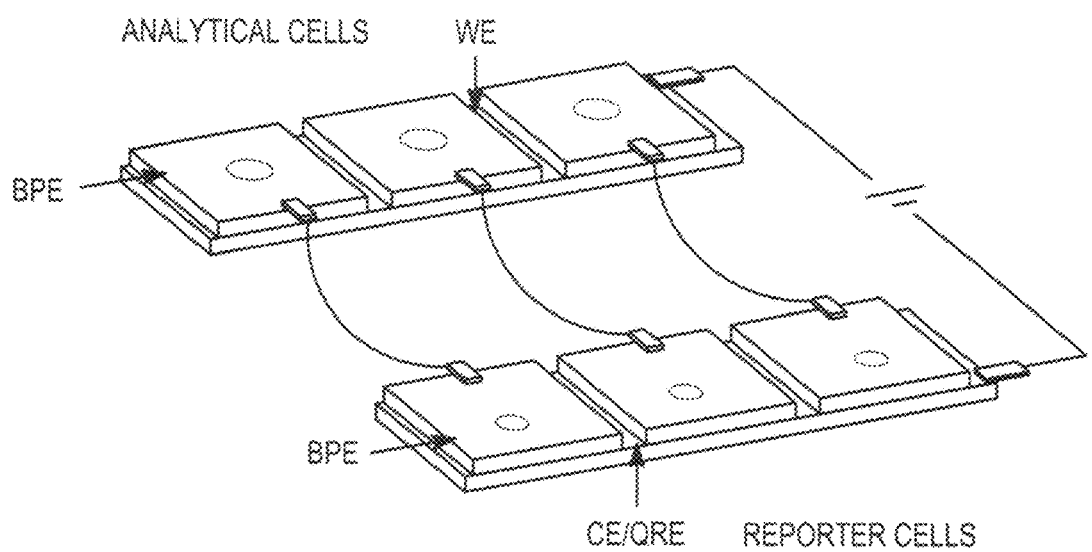
FIG. 10A-10C. (a) Schematic illustration of the CBE-enabled electrochromic sensor architecture for multiple analyte detection. (b) Color change in reporter cells for detection of 2.5 mM lactate, 2.5 mM glucose and 2.5 mM uric acid. Control samples were run without the specific analyte but with all other components (enzyme, $Fe(CN)_6^{3/4-}$) present. (c) Battery operation of a closed-BPE dual cell with multiplex colorimetric readout by smartphone camera yields a simple, inexpensive, field-deployable electrochemical sensor.

Multiple Analyte Detection. In many cases, clinic diagnoses can be improved by relying not on detection of a single biomarker, but by measuring multiple biomarkers. Thus, it is desirable to integrate multiple analyte determinations into a single electrochemical biosensing platform. As shown in FIG. 10(a), the CBE-enabled electrochromic device was modified for multiple simultaneous determinations using the design principles developed for single analyte detection. In this design, the device has three individually addressable channels, one for each of three analytes. Each channel possesses an independent BPE, while the WE and CE/RE are shared among the three channels. Each analyte reacts in its own specially-populated analytical cell at a common applied potential on the $WE_a$. Redox reactions in the analytical cells are coupled through the independent CBEs, and induce reactions in the corresponding reporter cell (CE/QRE).

Figure 10B:
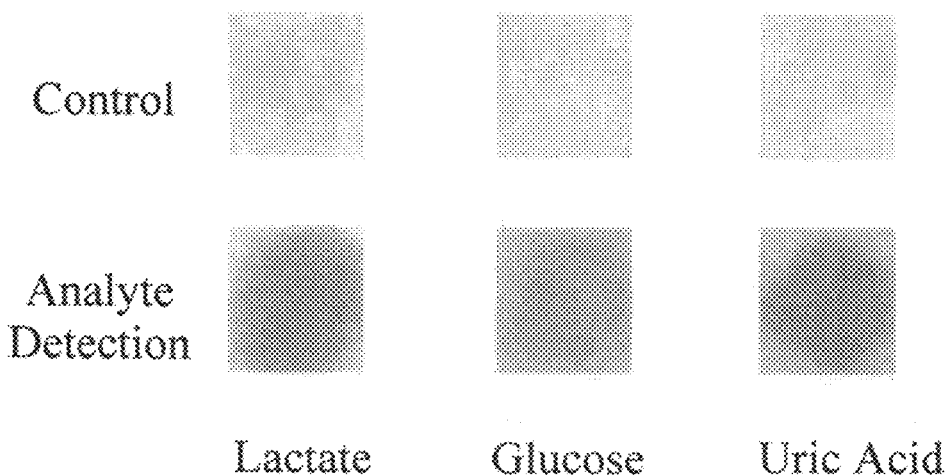
Figure 10C:
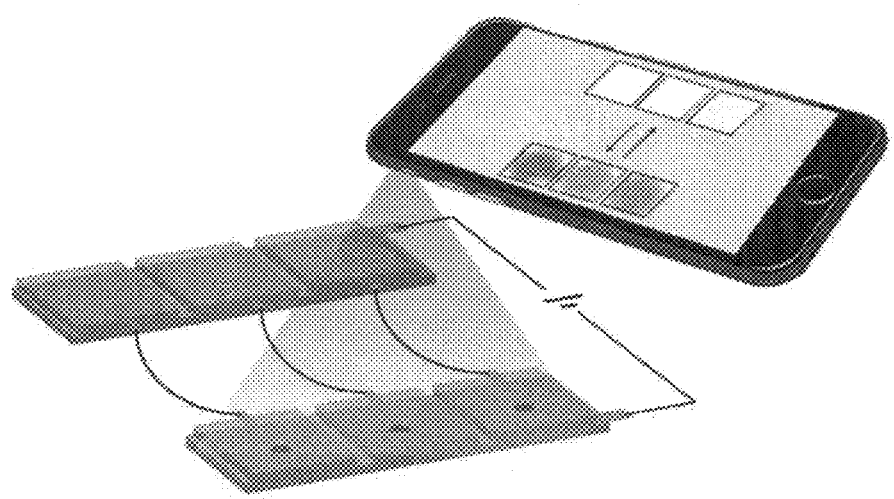

The integrated electrochromic device was next used to simultaneously detect 2.5 mM glucose, 2.5 mM lactate, and 2.5 mM uric acid as a model target analyte mixture, comparing results against a control experiment in which only ferricyanide and enzyme were added. In the control experiment, no color change was observed below $E_{appl}$=+3.2 V at $WE_a$, while in the presence of target analytes, color changes were observed at or above $E_{appl}$=+2.4 V. FIG. 10(b) shows the color change for detection of three metabolites and the relevant controls at $E_{appl}$=+3.0 V. An obvious purple color can be seen in the presence of analytes, confirming that multiple analytes can be determined simultaneously and independently by color change in a single multiplex device (see FIG. 10(c)).

Figure 11A:
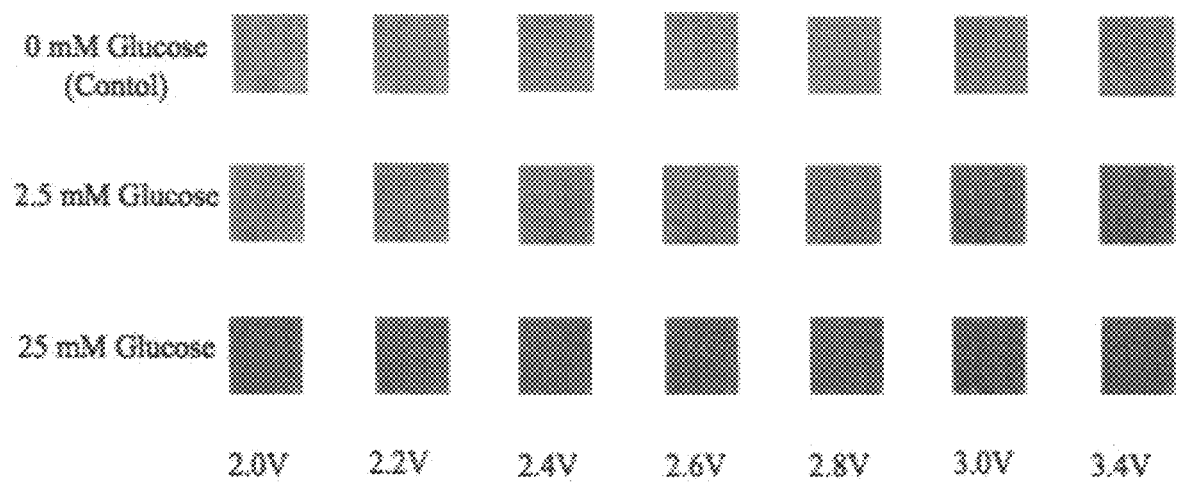
FIG. 11A-11B. (a) Color change in the reporter cell for 0 mM, 2.5 mM, and 25 mM glucose detection at different applied potentials. (b) Change in the green channel signal intensity ($\Delta I_G$) from RGB analysis of images in panel (a): 0 mM (control, squares), 2.5 mM (circles), and 25 mM (diamonds).
Figure 11B:
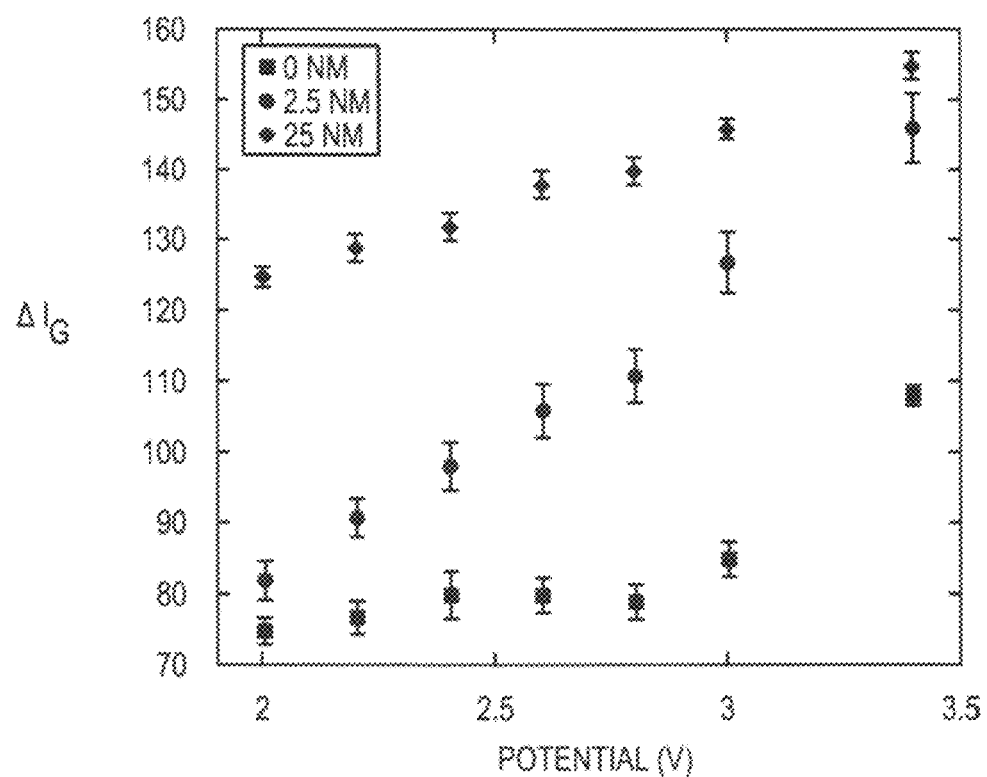

Clearly, the concentration response of the three analytes indicates that they respond linearly over different concentration ranges. Thus, to extend the results to provide semi-quantitative information, samples with glucose of 0 mM (control), 2.5 mM and 25 mM were placed in the three analytical cells. Potentials ranging from +2.0 V to +3.4V were applied to support redox cycling and the color change in reporter cells, as shown in FIGS. 11(a) and 11(b). The control experiment, blue squares FIG. 11(b), did not show an obvious color change in the range $E_{appl}$=+2.0 V to +3.0 V, indicating negligible electrochemical reaction from interferences over this range. However, $\Delta I_G$>0 was observed in the experiment at $E_{appl}$>+3.4 V was applied, illustrating the limit of the applied potential window. In contrast, the channel containing 2.5 mM glucose, red circles FIG. 11(b), exhibited a monotonically increasing color change with applied potential across the entire potential range. A similar trend was observed for 25 mM glucose, green diamonds FIG. 11(b), although the color change was larger than for 2.5 mM glucose at all applied potentials in the range. Interestingly, 25 mM glucose exhibited a substantial $\Delta I_G$ even at the lowest applied potential, +2.0V, suggesting that measurements at higher concentration ranges could be extended to smaller values of $E_{appl}$. Therefore, analytes with different concentrations can be distinguished visually from the color change in the reporter cells. These measurements suggest a further extension of the applications of this device in which multiple determinations could be made in a sample of unknown analyte concentration, assessing whether the concentration is within normal range by comparing the color change of the unknown with color changes obtained from upper limit and lower limit standards pre-loaded into the device.

Selectivity. Selectivity in these measurements is conferred by the specific enzymes used, making it possible to detect a target analyte in the presence of extraneous interferences. Since the enzyme preferentially reacts with its target substrate, a selective response, e.g. the measurement of lactate in the presence of glucose, can be obtained either through the amplified chronoamperometric current in the analytical cell or the resultant color change in the reporter cell. Three samples were prepared and detected within the CBE-enabled electrochromic detector, including: ferricyanide, lactate oxidase, and glucose (Sample I); ferricyanide, lactate oxidase, and lactate (Sample II); and ferricyanide, lactate oxidase, glucose and lactate (Sample III). These three samples were tested individually, and the potential required to observe detectable color change in each sample was recorded separately. A detectable color change was not observed (negative control) in sample I until $E_{appl}$>+2.2 V. However, color changes in samples II and III were observed at $E_{appl}$=+1.8 V. We attribute the difference in threshold driving potential for color change to the presence of lactate, the canonical substrate for lactate oxidase.

Figure 12:
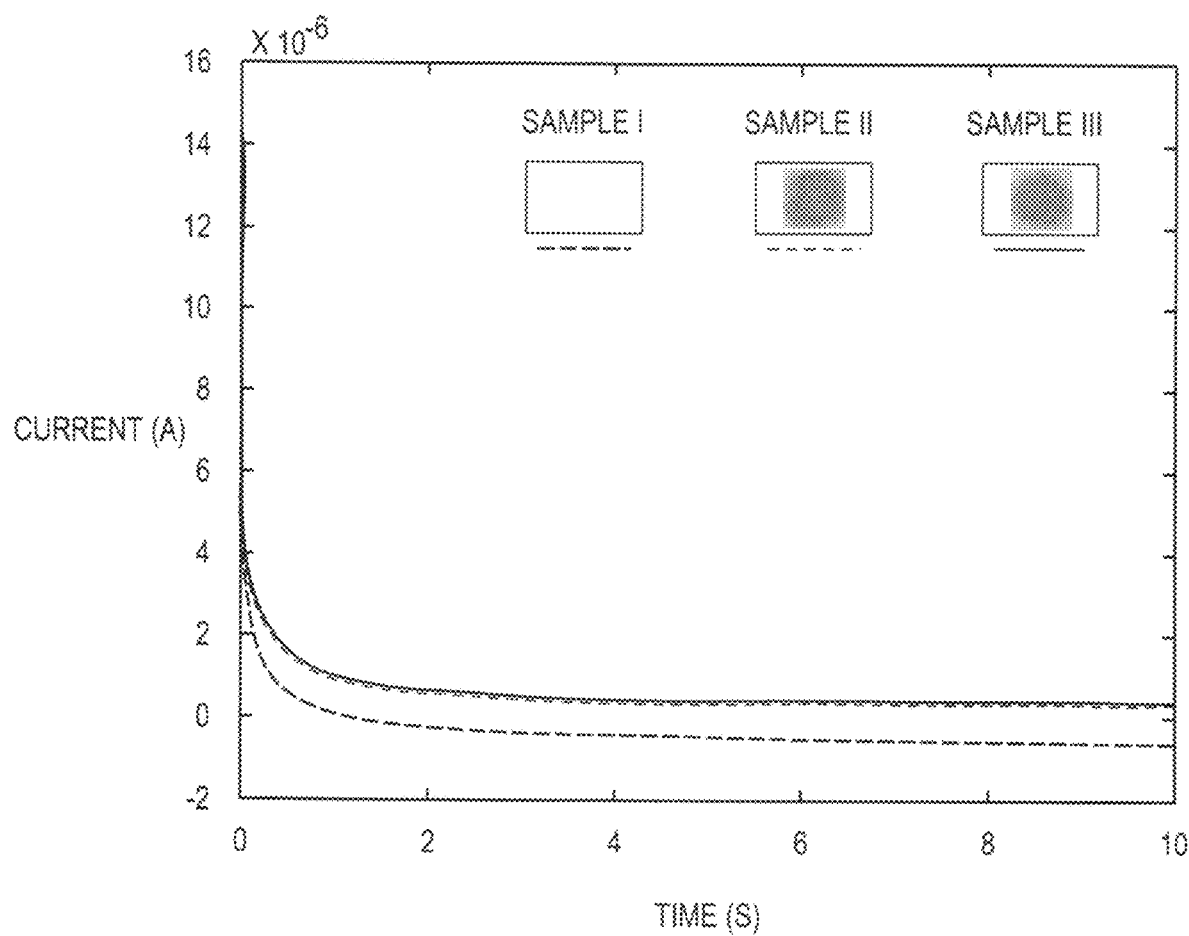
FIG. 12. Chronoamperometric currents obtained in the analytical cells from ferricyanide, lactate oxidase, and glucose (Sample I, black); ferricyanide, lactate oxidase, and lactate (Sample II, red); and ferricyanide, lactate oxidase, glucose and lactate (Sample III, blue). (Inset) Color changes observed in the reporter cells for Samples I, II, and III detection.

The chronoamperometric current plots associated with the detection of three samples at +1.8 V is shown in FIG. 12. Current produced by Sample I is lower than the currents achieved in Samples II and III and is indistinguishable from the background due to the absence of lactate and its consequent redox cycling. Lactate was detected in samples II and III, because the reaction with lactate oxidase, results in an amplified current which subsequently produces a color change in the reporter cell. Also, the measured currents for Sample II and Sample III were similar in amplitude, further substantiating the assertion that only lactate was detected when lactate oxidase was used. Similar results were observed with the other two enzymes, confirming that enzymes preferentially detect their canonical substrate with negligible interference from target compounds of other cells.

Figure 13:
FIG. 13. Color responses of 2.5 mM lactate detection with varying reporter cell volumes as a function of applied potential. Each cell is labeled with its diameter.
Figure 13:
Figure 13:
Figure 13:
Figure 13:
Figure 13:
Figure 13:
Figure 13:
Figure 13:
Figure 13:
Figure 13:
Figure 13:
Figure 13:
Figure 13:
Figure 13:
Figure 13:
Figure 13:
Figure 13:
Figure 13:
Figure 13:
Figure 13:

Sensitivity and Reporter Cell Geometry. The above results indicate that color development can saturate, effectively defining the upper concentration range of the device. We hypothesized that color change might vary as a function of reporter cell volume. Since the number of $MV^{2+} \rightarrow MV^+$ indicators reactions scales with the concentration in the analytical cell, reducing the volume effectively increases the concentration of indicator compound. An experiment with different reporter cell volumes was performed by varying the diameter of the detection region. In these experiments, 2.5 mM lactate was detected at different driving potentials in reporter cells of different volumes, as shown in FIG. 13. While the color change in reporter cell becomes darker at higher potentials for all three reporter cell volumes, the smallest cell exhibits the largest color change and the largest cell exhibits the least at any given potential. On the other hand, small reporter cells saturate at lower potentials than larger reporter cells. These experiments demonstrate that the detector sensitivity can be controlled by adjusting the volume of the reporter cell within the constraints imposed by tests with different detection ranges.

Figure 14A:
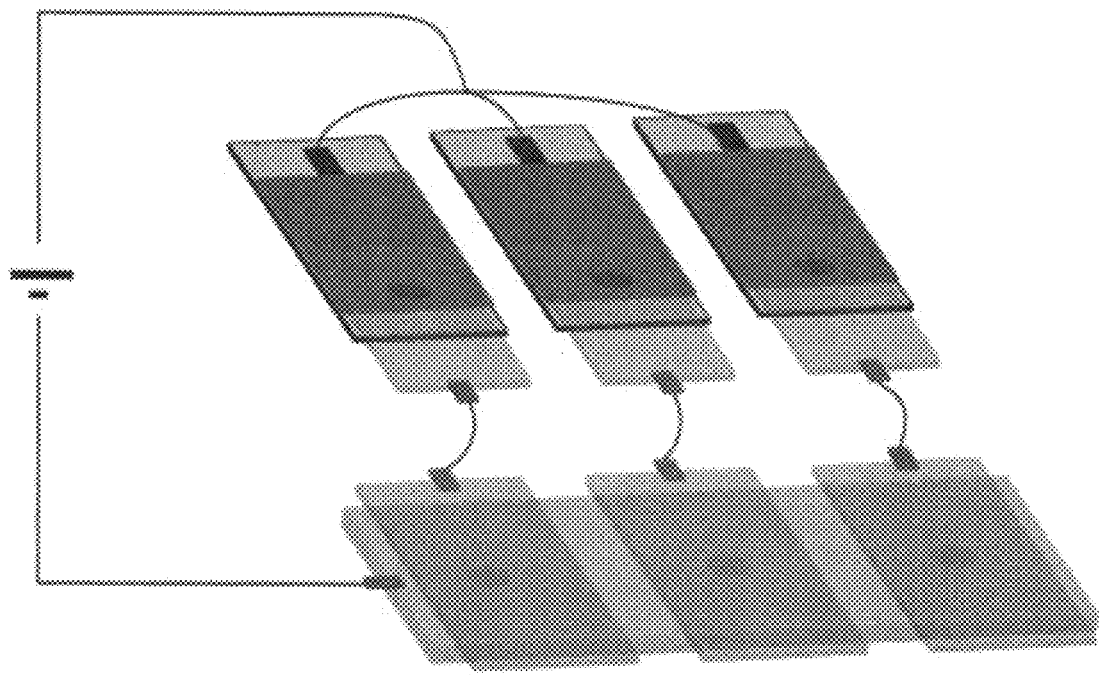
FIG. 14A-14B. (a) Schematic illustration of the CBE-enabled electrochromic sensor architecture with paper-based carbon working electrode for multiple analyte detection. (b) Color change in reporter cells for detection of 2.5 mM lactate, 2.5 mM glucose and 2.5 mM uric acid.
Figure 14B:
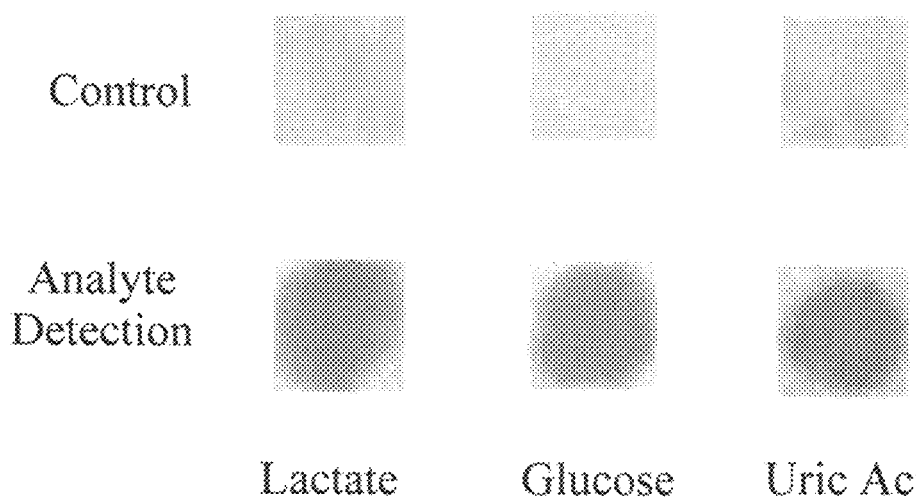

Paper Analytical Cells. Paper-based devices benefit from being portable, disposable and inexpensive, dictating their use in POC devices where possible. In light of this, the ITO $WE_a$ was replaced with a paper-based carbon $WE_a$, FIG. 14(a), all other components remaining the same. A mixture of 2.5 mM glucose, 2.5 mM lactate, and 2.5 mM uric acid was used as model analyte, while only ferricyanide and the relevant enzyme were added in the control experiment. For the control experiment, no color change in the reporter cell was observed until $E_{appl}>+2.0$ V, however, detectable color change in reporter cell for was observed starting from $E_{appl}=+1.6$ V. FIG. 14(b) presents the observed reporter cell color changes for both analyte detection and control experiments at $E_{appl}=+2.0$ V. In all three cases, an obvious color change was observed in the reporter cell compared to the control, in a manner qualitatively similar to the results observed with the ITO $WE_a$. These results confirm that detection can be performed with a paper-based carbon $WE_a$ without significant loss of performance, pointing the way to the development of CBE-enabled electrochromic sensors with disposable paper cells for POC applications.

Conclusions. A split-cell CBE-based electrochromic multiplex sensor has been developed for metabolite detection and tested by application to lactate, glucose and uric acid mixtures. In this design, the mediator and specific enzyme make it possible to detect non-redox active molecules by enzymatically converting target analytes to redox-active products in an analytical cell, which can then produce electrochemical signals. Because the electrochemical reaction in the analytical cell is CBE-coupled to the electrochromic reduction of $MV^{2+}$ in the reporter cell, the presence of target molecule in analytical cell can also be monitored by observing the color change in the reporter cell. Analyte detection based on colorimetry in the reporter cell is confirmed by analytical cell chronoamperometric currents and is quantitative with analyte concentration over specific ranges, typically <1 mM. The CBE electrochromic sensor is capable of multiplex operation by integrating three sets of detection chemistries into a single device, rendering it capable of detecting multiple analytes with different concentrations simultaneously. Analytes with unknown concentrations can be determined semi-quantitatively by bracketing them in an range of color change produced by standards of known concentration. The CBE device is also selective to target analyte due to the activity of the specific enzymes in each channel. Chronoamperometric currents and colorimetric signals agree, in that detection requires the canonical substrate for the enzyme to produce signal for both. Sensitivity can be adjusted over limited ranges by varying reporter cell volume. Finally, devices with paper-based $WE_a$ were used for detection of multiple analytes simultaneously, providing an inexpensive method for further device simplification. Altogether, this CBE based electrochromic detector constitutes a low cost and simple electrochemical biosensing platform for simultaneous multiple-analyte detection. It is sufficiently versatile that it could be extended to a variety of applications by changing the detection chemistry, the only requirement being a recognition reaction that produces an electroactive product that can be coupled to the reporter cell through the CBE.

The following Examples are intended to illustrate the above invention and should not be construed as to narrow its scope. One skilled in the art will readily recognize that the Examples suggest many other ways in which the invention could be practiced. It should be understood that numerous variations and modifications may be made while remaining within the scope of the invention.

EXAMPLES

Chemicals and Materials. Methyl viologen, dopamine hydrochloride, tetrabutylammonium tetraphenylborate, ferrocene, acetaminophen, acetonitrile, glucose, glucose oxidase, lactate, lactate oxidase, uric acid, and uricase were obtained and used as received from Sigma-Aldrich. Potassium chloride and potassium ferricyanide were obtained from Fisher Scientific. Poly(dimethylsiloxane) (PDMS) (Sylgard, 184, Dow Corning) was used as received. All chemicals were analytical grade and used as received without further purification. All solutions were prepared using 18.2 MΩ cm deionized (DI) water by Milli-Q Gradient System. Tape (Scotch), paper-based carbon electrodes (CH Instruments, Inc) and indium tin oxide (ITO) coated glass slides with different conductivities (including 70~100Ω and 8~12Ω) (Delta Technologies and Sigma-Aldrich) were used for device fabrication. The ITO ($In_2O_3/SnO_2$) coated glass slides from Sigma Aldrich has a surface resistivity of 8-12Ω/sq, a transmittance of >83%, a refractive index of n20/D 1.517, and a film thickness of 120 nm to 160 nm. All reagents were analytical grade.

Example 1

Device Assembly of Electrochromic Sensor Device for Single Analyte Detection and Colorimetric Measurements Electrochromic sensor devices were constructed to include analytical and reporter cells, connected by a closed BPE. A glass slide coated by Ti/Pt (Ti 10 nm, Pt 100 nm) was used as a working electrode ($WE_a$) in the analytical cell. The analytical cell (1.5 cm×2.5 cm) was fabricated by placing tape (50 μm thick) around the periphery to act as a spacer between the analytical cell working electrode, $WE_a$, and the ITO BPE. The structure of the reporter cell was similar to that of the analytical cell, except that instead of using a Ti/Pt coated slide, an ITO slide was employed as counter/quasi reference electrode (CE/QRE) (FIG. 1(a)). A small (1 mm×1 mm) observation window was opened in the tape spacer and filled with indicator solution, 10 mM methyl viologen in 0.1 M KCl. The BPE was composed of the top ITO electrode in both analytical and reporter cells connected to each other by Cu wire. For the non-aqueous experiments, the tape spacer was replaced by a thin PDMS wall in the in the analytical region because the organic solvent used, i.e. acetonitrile, is incompatible with adhesive tape. Non-aqueous experiments were conducted in acetonitrile with 0.1 M tetrabutylammonium tetraphenylborate, TBATPB, as background electrolyte.

Electrochemical measurements were performed on a commercial potentiostat (CHI 842C, CH Instruments). Potentials ranging from +2.0V to +3.0V were applied to $WE_a$ to drive the redox reaction in the analytical cell. Color change of the MV indicator solution was measured on an epifluorescence microscope (IX-71, Olympus) equipped with appropriate filter set (pass band 510-560 nm) (Chroma Technology Inc.). The intensity data were collected by an electron-multiplier CCD camera (PhotonMax512, Princeton Instruments) at 6 frames per second. In smartphone-based detection, images were acquired with an iPhone 6 (Apple) equipped with a macro lens (Olloclip) at 21× magnification with images acquired 16 mm above the device. The camera was operated in manual mode with parameters set as follows: ISO sensitivity: 100; shutter speed: 1/20 s; white balance: auto. Images were stored in RAW-format, and the red-green-blue readout (RGB) of each image was analyzed by ImageJ software. In experiments employing battery-based potentials, potential was applied by two AA batteries (Energizer) in place of the potentiostat.

Example 2

Device Assembly for Multiplex Sensing

Figure 8A:
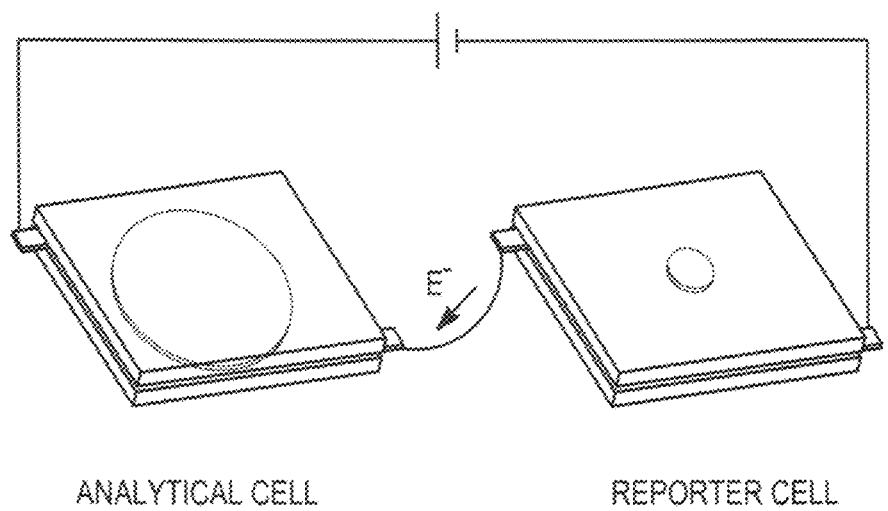
FIG. 8A-8B. (a) Schematic illustration of the CBE-enabled electrochromic sensor architecture. (b) Reaction scheme for lactate detection in the analytical cell.
Figure 8B:
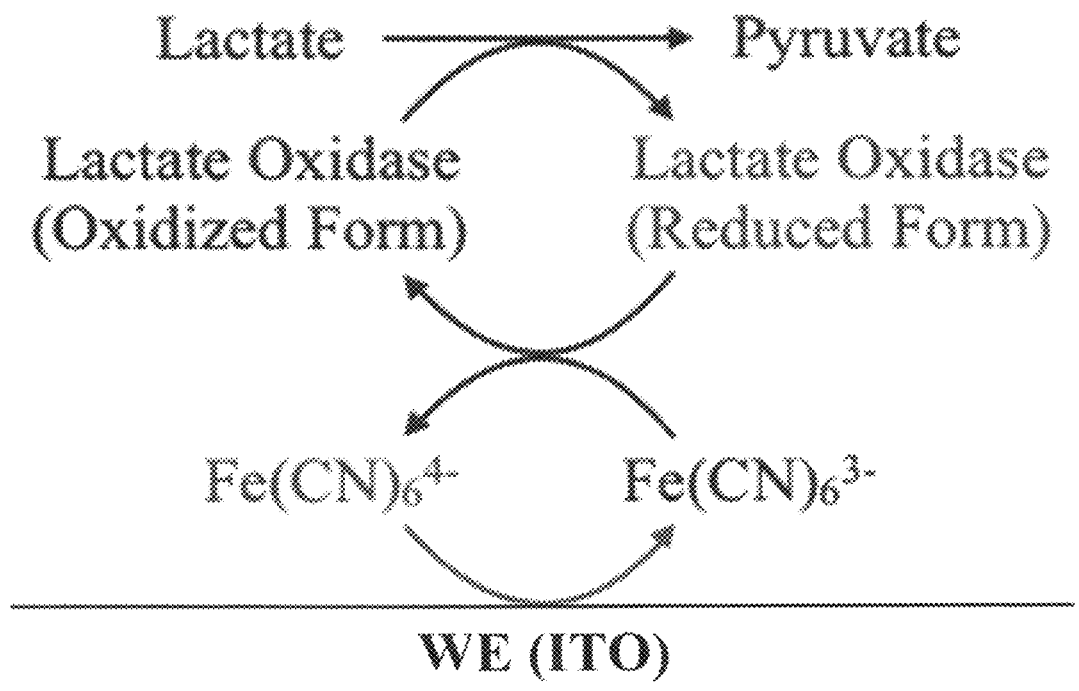

Circular analytical cells (Ø 10 mm) and reporter cells (Ø 1 mm) were fabricated by placing tape (50 µm thick) around the periphery to act as a spacer between the analytical cell working electrode ($WE_a$) or counter/quasi reference electrode (CE/QRE) and the ITO CBE, respectively, FIG. 8(a). The observation window in the reporter cell was opened in the tape spacer and filled with indicator solution, e.g. 10 mM methyl viologen in 0.1 M KCl, and the analytical cell was opened and filled with analyte solution. Analytical and reporter cells were connected by a CBE, which was composed of the top ITO electrodes in both analytical and reporter cells connected to each other by a Cu wire. For multiple analyte detection, the device consisted of three sets of independent electrochromic sensors to monitor the detection of three different analytes simultaneously. In this design, the $WE_a$ and CE/QRE were shared by three sets of sensors, while each sensor had its own ITO BPE bridged between the $WE_a$ and CE/QRE for electron transfer without interference. Different target analytes were placed in different analytical cells, while the same indicator solution was used to fill all reporter cells. In some experiments, the ITO $WE_a$ was replaced by a paper-based carbon $WE_a$ to perform multiple analyte detection, while the remaining parts of the device were unchanged. To effect multiplex sensing, three-channel detection with three metabolites was performed within a single device, and the color change in each reporter cell was captured independently.

Electrochemical and Colorimetric Measurements. Electrochemical measurements were performed on a commercial potentiostat (CHI 842C, CH Instruments). Potentials ranging from 2.0V to 3.0V were applied on $WE_a$ to drive the redox reaction in the analytical cell and to trigger the color change of electrochromic indicator in the reporter cell through a CBE. For smartphone-based detection, images were acquired with an iPhone 6 (Apple) equipped with a macro lens (Olloclip) at 21× magnification at a height of 16 mm above the observation window of the reporter cells. The built-in camera was operated in manual mode with the following parameters: ISO sensitivity: 100, shutter speed: 1/20 s and auto white balance. Images were captured in RAW-format and then were analyzed by ImageJ software to obtain the red-green-blue (RGB) color information. The green channel intensity was used for further analysis.

Summary

A BPE-enabled apparatus and method for electrochemical sensing based on the electrochromic response of a color indicator in a field-deployable format is disclosed herein. Bipolar electrodes (BPE) are electrically floating metallic elements placed in electrified fluids that enable the coupling of anodic and cathodic redox reactions at the opposite ends by electron transfer through the electrode. This BPE-enabled device includes two separated thin layer chambers which perform detection and reporting independently. Analytical reaction of a target molecule in the analytical cell is coupled to and monitored by an electrochromic reaction in the reporting cell. The color change in the reporting cell can be determined spectrophotometrically, but in this invention, it is also determined by RGB analysis of a CCD image acquired via smartphone. This detection method provides a linear response and a low limit of detection due to the redox cycling behavior in both chambers. In addition, the potentiostat used in standard bench-scale electrochemical detectors is replaced by a battery to control potential, contributing to the simplicity and portability of the device. This system is applicable to detect analytes in both aqueous and non-aqueous phases because of the physical separation of reporting and analytical cells.

Also described herein is a bipolar electrode based electrochromic device for metabolite detection, including but not limited to lactate, glucose, and uric acid. A redox mediator is combined with a specific oxidase, e.g. lactate oxidase, glucose oxidase or uricase to form an electrochemical mediator electrocatalyst pair that can help complete redox cycling reactions. By using bipolar electrode as the bridge of electron transfer, the color change in the reporter cell increases as the concentration of analyte in the analytical cell increases. Then bipolar electrode based electrochromic detector is modified for sensing of multiple analytes by integrating three sets of detection chemistries into one single device for rapid screening. Multiple analytes with different concentrations can be detected within this device simultaneously. Due to the activity of the enzyme, the closed BPE device can perform good selectivity to the target analyte. In addition, reporter cells with different sizes exhibit different sensitivities for a wider detection range of target molecules.

While specific embodiments have been described above with reference to the disclosed embodiments and examples, such embodiments are only illustrative and do not limit the scope of the invention. Changes and modifications can be made in accordance with ordinary skill in the art without departing from the invention in its broader aspects as defined in the following claims.

All publications, patents, and patent documents are incorporated by reference herein, as though individually incorporated by reference. No limitations inconsistent with this disclosure are to be understood therefrom. The invention has been described with reference to various specific and preferred embodiments and techniques. However, it should be understood that many variations and modifications may be made while remaining within the spirit and scope of the invention.

What is claimed is:

1. A closed bipolar electrode-enabled sensor apparatus, the apparatus comprising:
   a) a bipolar electrode having a first compartment and a paired compartment;
   b) a first electrode in proximity to the first compartment of the bipolar electrode;
   c) a second electrode in proximity to the paired compartment of the bipolar electrode;
   d) an insulator, at the bipolar electrode, defining the first compartment and the paired compartment, wherein the first compartment and the paired compartment are connected by the bipolar electrode, and wherein the bipolar electrode is separated from the first electrode and the second electrode by the insulator; and
   e) a redox mediator and oxidase forming an electrochemical mediator-electrocatalyst pair that supports redox cycling at the first compartment, and a sensor at the paired compartment, wherein the paired compartment is configured to transmit an electrochromic signal by the sensor;
   wherein a closed bipolar electrode has a closed configuration defined by elements a-d, and an electrochromic signal can be transmitted from the paired compartment of the closed bipolar electrode by the sensor that can sense a redox reaction of an analyte at the first compartment of the closed bipolar electrode when a potential exists across the first electrode and the second electrode; and optionally, wherein a multiplex apparatus of a closed bipolar electrode-enabled sensor includes more than one closed bipolar electrode in parallel with the first electrode and the second electrode.

2. The apparatus of claim 1 wherein the sensor comprises an electrochromic chemical reporter having an absorption spectrum that depends on the electrochromic chemical reporter's state of oxidation, and wherein the electrochromic chemical reporter's state of oxidation depends on an analyte's state of oxidation in the first compartment.

3. The apparatus of claim 2 wherein the electrochromic chemical reporter comprises a viologen, an alkyl viologen, paraquat, prussian blue, an electrochromic polymer, or a combination thereof.

4. The apparatus of claim 2 wherein the electrochromic chemical reporter has a concentration greater than 0 mM to about 30 mM in a solution, and wherein the solution optionally comprises an electrolyte.

5. The apparatus of claim 2 wherein the paired compartment comprises an observation window that is essentially transparent in the spectral region of an electrochromic chemical reporter.

6. The apparatus of claim 1 wherein the apparatus comprises a colorimeter.

7. The apparatus of claim 6 wherein the colorimeter comprises a charge coupled device (CCD) camera, a complementary metal-oxide semiconductor (CMOS) camera, or a smart phone camera.

8. The apparatus of claim 1 wherein the first compartment comprises an inlet for a sample for analysis.

9. The apparatus of claim 1 wherein the bipolar electrode comprises indium tin oxide.

10. The apparatus of claim 1 wherein the first electrode comprises titanium, platinum, chromium, gold, indium, tin, nickel, or a combination thereof, or the first electrode comprises a cellulose-based carbon electrode, and the second electrode comprises indium tin oxide.

11. The apparatus of claim 1 wherein the bipolar electrode is split into a first cell and a second cell that are physically separated, and wherein the first cell comprises the first compartment and second cell comprises the paired compartment, and the first cell and second cell are joined by an electrically conductive moiety that permits electron transfer between the first cell and the second cell.

12. The apparatus of claim 1 wherein the redox mediator comprises ferricyanide, ferrocene, hexaammineruthenium, or a combination thereof.

13. The apparatus of claim 1 wherein the oxidase is substrate specific for the analyte.

14. The apparatus of claim 1 wherein the oxidase is glucose oxidase, lactate oxidase, or urate oxidase.

15. A method for detecting an analyte in the apparatus according to claim 1, the method comprising:

a) adding a sample to the first compartment, wherein the sample comprises an aqueous solution or the sample comprises a non-aqueous solution;
b) measuring a baseline signal of an electrochromic chemical reporter with a colorimeter without applying a voltage across the first electrode and the second electrode, wherein the sensor comprises the electrochemical reporter;
c) applying a voltage potential across the first electrode and the second electrode;
d) selectively sensing the presence of an analyte that is present in the sample; and
e) detecting a change in the signal of the electrochromic chemical reporter with a colorimeter after applying a voltage potential across the first electrode and the second electrode;
wherein the electrochromic chemical reporter signals a change in the electrochromic chemical reporter's absorption spectrum when an analyte is present in the sample; and
wherein a different sample can be added to each first compartment of a multiplex apparatus for multiplex detection.

16. The method of claim 15 wherein the voltage potential ranges from about 0.01 volts to about 10 volts.

17. The method of claim 15 wherein the colorimeter comprises a CCD, a CMOS, or a smart phone camera, and when the colorimeter comprises the smart phone camera, the smart phone camera records a red-green-blue (RGB) color image of the electrochromic chemical reporter.

18. The method of claim 17 wherein the green channel of the RGB color image is analyzed to quantitate an analyte that is present in a sample.

19. The method of claim 15 wherein the analyte is a non-redox active molecule that is enzymatically converted to redox active products;
wherein a redox reaction in the first compartment of the closed bipolar electrode results in an equal and opposite redox reaction in the paired compartment of the closed bipolar electrode, and wherein redox reactions in both the first compartment and the paired compartment are charged balanced and reversible.

20. An electrochromatic detector for a non-redox active molecule, comprising:
a closed bipolar electrode having a first compartment and a paired compartment;
the first compartment comprises a sample inlet, redox mediator and oxidase; and
the second compartment comprises an observation window and electrochromic chemical reporter;
wherein the first compartment is configured to report a redox reaction of an analyte to the second compartment as a color change detectable by naked eye; and
the analyte is a non-redox active molecule that can be enzymatically converted to redox active products by the oxidase, thereby detected by the electrochromatic detector.

* * * * *